United States Patent
Xin et al.

(10) Patent No.: US 12,439,454 B2
(45) Date of Patent: Oct. 7, 2025

(54) CHANNEL ACCESS ON NON-SIMULTANEOUS TRANSMIT/RECEIVE LINK

(71) Applicants: SONY GROUP CORPORATION, Tokyo (JP); SONY CORPORATION OF AMERICA, New York, NY (US)

(72) Inventors: Liangxiao Xin, San Jose, CA (US); Mohamed Abouelseoud, Burlingame, CA (US); Li-Hsiang Sun, San Jose, CA (US); Qing Xia, Burlingame, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 386 days.

(21) Appl. No.: 17/847,342

(22) Filed: Jun. 23, 2022

(65) Prior Publication Data
US 2023/0029957 A1 Feb. 2, 2023

Related U.S. Application Data

(60) Provisional application No. 63/223,634, filed on Jul. 20, 2021.

(51) Int. Cl.
*H04W 74/0816* (2024.01)
*H04W 72/0446* (2023.01)
(Continued)

(52) U.S. Cl.
CPC ... *H04W 74/0816* (2013.01); *H04W 72/0446* (2013.01); *H04W 74/085* (2013.01); *H04W 74/0866* (2013.01)

(58) Field of Classification Search
CPC ......... H04W 72/0446; H04W 72/0816; H04W 74/085; H04W 74/0866; H04W 84/12; H04W 74/002; H04W 76/15
See application file for complete search history.

(56) References Cited

U.S. PATENT DOCUMENTS

| | | | | |
|---|---|---|---|---|
| 2002/0188723 A1* | 12/2002 | Choi | ..................... | H04W 36/06 709/225 |
| 2007/0291702 A1* | 12/2007 | Nanba | ...................... | H04J 3/00 370/336 |

(Continued)

FOREIGN PATENT DOCUMENTS

| | | |
|---|---|---|
| JP | 2012169955 A | 9/2012 |
| JP | 2015144451 A | 8/2015 |

(Continued)

OTHER PUBLICATIONS

Yongho Seok (Mediatek), "RTS and CTS Procedure in Synchronous Multi-link Operation", IEEE Draft, 11-20-0577-00-00BE-RTS-and-CTS-Procedure-in-Synchronous-Multi-Link-Operation, IEEE-SA Mentor, Piscataway, NJ USA, vol. 802.11 EHT, 802.11be, Apr. 13, 2020 (Apr. 13, 2020), pp. 1-20, XP068172748.

(Continued)

*Primary Examiner* — Stephen J Clawson
(74) *Attorney, Agent, or Firm* — O'BANION & RITCHEY LLP; John P. O'Banion

(57) ABSTRACT

A wireless communications protocol in which multiple-link operations provide enhanced efficiency in particular for non-simultaneous transmit receive (NSTR) communications between stations (STAs) of multiple-link devices (MLDs). When MLD1 is the TXOP holder of Link1 and the channel is accessed on Link2 by MLD2 for transmitting to MLD1; MLD2 immediately transmits over Link2 to MLD1, if MLD1 is receiving on Link1. MLD2 transmits a frame over Link2 to occupy the channel if MLD1 is transmitting on Link1, then when MLD1 is receiving on Link1 then MLD2 transmits another frame to MLD1.

18 Claims, 29 Drawing Sheets

(51) Int. Cl.
*H04W 74/08* (2009.01)
*H04W 74/0833* (2024.01)

(56) References Cited

U.S. PATENT DOCUMENTS

| | | | |
|---|---|---|---|
| 2013/0049939 A1* | 2/2013 | Vijayasankar | H04B 3/542 340/13.23 |
| 2014/0064231 A1* | 3/2014 | Park | H04W 74/002 370/329 |
| 2015/0244619 A1* | 8/2015 | Zheng | H04L 1/0061 370/392 |
| 2017/0294949 A1* | 10/2017 | Zhang | H04W 52/46 |
| 2019/0029041 A1 | 1/2019 | Tomeba | |
| 2021/0211375 A1* | 7/2021 | Kwon | H04L 45/24 |
| 2021/0212118 A1 | 7/2021 | Lu | |
| 2021/0315025 A1* | 10/2021 | Seok | H04W 74/0891 |
| 2021/0377928 A1* | 12/2021 | Seok | H04L 69/14 |
| 2024/0057160 A1 | 2/2024 | Lu | |

FOREIGN PATENT DOCUMENTS

| | | |
|---|---|---|
| JP | 2019041136 A | 3/2019 |
| JP | 2023528106 A | 7/2023 |
| WO | WO-2011100467 A | 8/2011 |
| WO | 2021010664 A1 | 1/2021 |
| WO | WO-2021244090 A | 12/2021 |

OTHER PUBLICATIONS

Yongho Seok (Mediatek), "Multi-link Constraint Signaling", IEEE Draft, 11-20-0527-01-00BE-Multi-Link-Constraints-Sigaling, IEEE-SA Mentor, Piscataway, NJ USA, vol. 802.11 EHT, 802.11be, No. 127, Jul. 2020 (Jul. 27, 2020), pp. 1-9, XP068170277.
Dmitry Akhmetov, et al., "Asynchronous multi-link operation for non-STR STA", IEEE 802.11-20/0455r1, Apr. 10, 2020, pp. 1-22.
Liuming Lu et al., "Multi-link Operation for Constrained MLD", IEEE 802.11-20/0972r0, Jun. 28, 2020.

* cited by examiner

Data frame | Frame Control | Duration | RA | TA | Sequence Control | Data | FCS |

FIG. 2
(Prior Art)

ACK frame | Frame Control | Duration | RA | FCS |

FIG. 3
(Prior Art)

HE-SU | L-STF (8μs) | L-LTF (8μs) | L-SIG (4μs) | RL-SIG (4μs) | HE-SIG-A (8μs) | HE-STF (4μs) | HE-LTFs | Data | PE |

FIG. 4
(Prior Art)

CHANNEL ACCESS ON NON-SIMULTANEOUS TRANSMIT/RECEIVE LINK

CROSS-REFERENCE TO RELATED APPLICATIONS

This application claims priority to, and the benefit of, U.S. provisional patent application Ser. No. 63/223,634 filed on Jul. 20, 2021, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to Wireless LANs (WLANS) using Carrier Sense Multiple Access/Collision Avoidance (CSMA/CA) for channel access, and more particularly in obtaining channel access for stations of Non-Simultaneous Transmit/Receive (NSTR) Multi-Link Devices (MLDS).

2. Background Discussion

Current wireless technologies using CSMA/CA focus on high throughput performance of the network but lack adequate low latency capability. Thus, a technology gap exists, since an increasing number of applications, including real time applications (RTA), require low latency communication capability.

RTAs requires low latency communication and use best effort communication. The data generated from the RTA is called RTA traffic and is packetized as RTA packets at the transmitter STA. Conversely, the data generated from non-time sensitive applications is called non-RTA traffic and is packetized as non-RTA packets at the transmitter STA.

RTA packets require low latency due to their high timeliness requirements on packet delivery. It will be noted that an RTA packet is only valid if is delivered within a certain period of time.

These issues are further complicated since some stations STAs can perform Simultaneous Transmit and Receive (STR) as STR STAs, while other STAs are unable to simultaneously transmit and receive and are referred to as non-STR STAs.

Accordingly, a need exists for a WLAN CSMA/CA protocol which can support RTA communications for both STR and non-STR STAs. The present disclosure overcomes these issues while providing additional benefits.

BRIEF SUMMARY

A Wireless Local Area Network (WLAN) operating under an IEEE 802.11 protocol using Carrier Sense Multiple Access/Collision Avoidance (CSMA/CA), such as 802.11be, which allows a Non-Simultaneous Transmit/Receive (NSTR) station (STA) to occupy the channel even though it cannot immediately transmit after gaining channel access. In this protocol, associated Multiple-Link Devices (MLDs) arrange transmissions over the links simultaneously although the Transmit Opportunity (TXOP) holders on the two links are from different MLDs.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 2 is a data field diagram depicting a data frame format in regular WLAN system.

FIG. 3 is a data field diagram depicting an ACK frame format in a regular WLAN system.

FIG. 4 is a data field diagram depicting a High Efficiency (HE) single user (SU) Physical Layer Protocol Data Unit (PPDU) format used for transmission in IEEE 802.11ax.

DETAILED DESCRIPTION

1. Introduction to WLAN 1.1. CSMA/CA WLAN Systems

In WLAN systems, IEEE 802.11 uses Carrier Sense Multiple Access/Collision Avoidance (CSMA/CA) to allow STAs to have access to the channel for packet transmission and retransmission.

Figure 1:
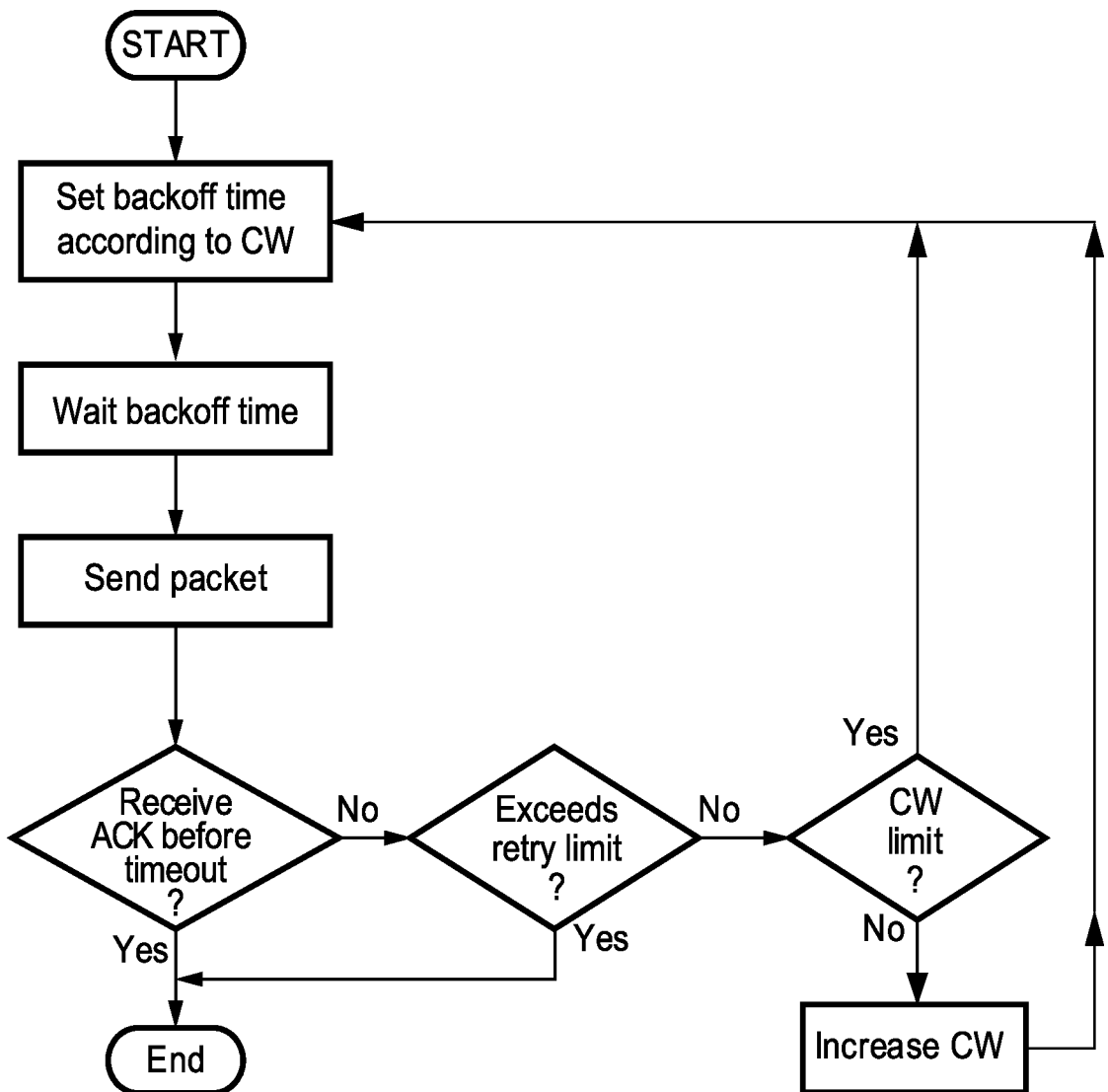
FIG. 1 is a flow diagram of a CSMA/CA channel access process in an IEEE 802.11 wireless LAN.

FIG. 1 depicts a CSMA/CA channel access process. In a CSMA/CA system, before each transmission and retransmission, the STA is required to sense the channel and set a backoff time to contend for channel access. The backoff time is decided by a uniform random variable between zero and the size of contention window. During contention the STA senses that the channel is idle, and decrements its backoff. When the backoff reaches zero then the STA has obtained the channel to transmit a packet. A retransmission may be required if the STA does not receive an Acknowledgment (ACK) before a timeout interval expires. Otherwise, the transmission succeeds.

When retransmission is required, the STA checks the number of retransmissions for the packet. If the number of retransmissions exceeds the retry limit, then the packet is dropped, and no retransmission is scheduled. Otherwise, retransmission is scheduled.

Before performing the retransmission, another backoff time is needed to contend for channel access. If the size of the Contention Window (CW) has not reached the upper limit of CW size, then the STA increases the CW size. The STA sets another backoff time depending on the new size of the contention window. The STA waits the backoff time for retransmission and this continues until a successful transmission or retransmission is achieved.

FIG. 2 illustrates a data frame format in a regular WLAN system. A Frame Control field indicates the type of frame. A Duration field contains NAV information used for CSMA/CA channel access. A RA field contains an address for the recipient of the frame. A TA field contains the address of the STA that transmitted the frame. A Sequence Control field contains the fragment number and the sequence number of the packet.

FIG. 3 illustrates an ACK frame format in a regular WLAN system. A Frame Control field indicates the type of frame. A Duration field contains NAV information used for CSMA/CA channel access. An RA field contains the address of the recipient of the frame.

FIG. 4 illustrates a High Efficiency (HE) single user (SU) Physical layer Protocol Data Unit (PPDU) format used for transmission in IEEE 802.11ax. It will be noted that a PPDU contains at least a preamble field and a data field, and in at least one embodiment has the following fields. An L-STF field is a non-High-Throughput (non-HT) short training field. An L-LTF field is a non-HT long training field. An L-SIG field is a non-HT SIGNAL field. An RL-SIG field is a repeated non-HT SIGNAL field. An HE-SIG-A field is an HE SIGNAL A field. An HE-STF field is an HE short training field. An HE-LTF field is an HE long training field. A Data field carries the data of the Physical layer convergence procedure (PLCP) Protocol Data Unit, which is referred to as (PSDU). A PE field is a packet extension field.

Figure 5:
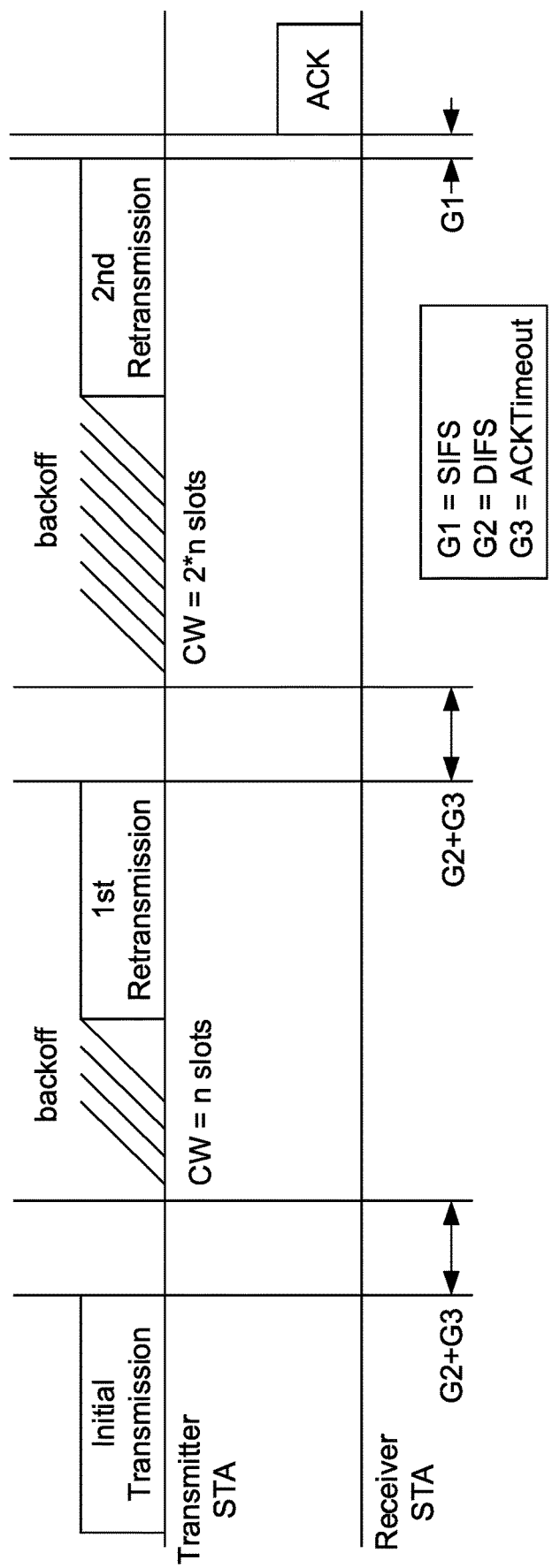
FIG. 5 is a communication diagram of retransmission under CSMA/CA where the backoff time is increased due to retransmission.

FIG. 5 illustrates one example of retransmission under CSMA/CA where the backoff time is increased due to retransmission. The data frame and the ACK frame use the formats as shown in FIG. 2 and FIG. 3, respectively. The frames are packetized using the packet format as shown in FIG. 4. After the transmitter transmits the initial transmission of a packet, it does not receive the ACK before timeout. Then, it sets another backoff time, whereby the size of the contention window is "n" slots. After waiting the backoff time, the transmitter STA retransmits the packet for the first time. However, in the example the retransmission also fails. In order for the transmitter STA to retransmit the packet it sets backoff time again to contend for the channel access. However, this time, the size of the contention window is doubled, which is 2*n slots, due to it being a retransmission. The expected backoff time is also doubled by the contention window size. The second retransmission succeeds since it receives an ACK before timeout.

Figure 6:
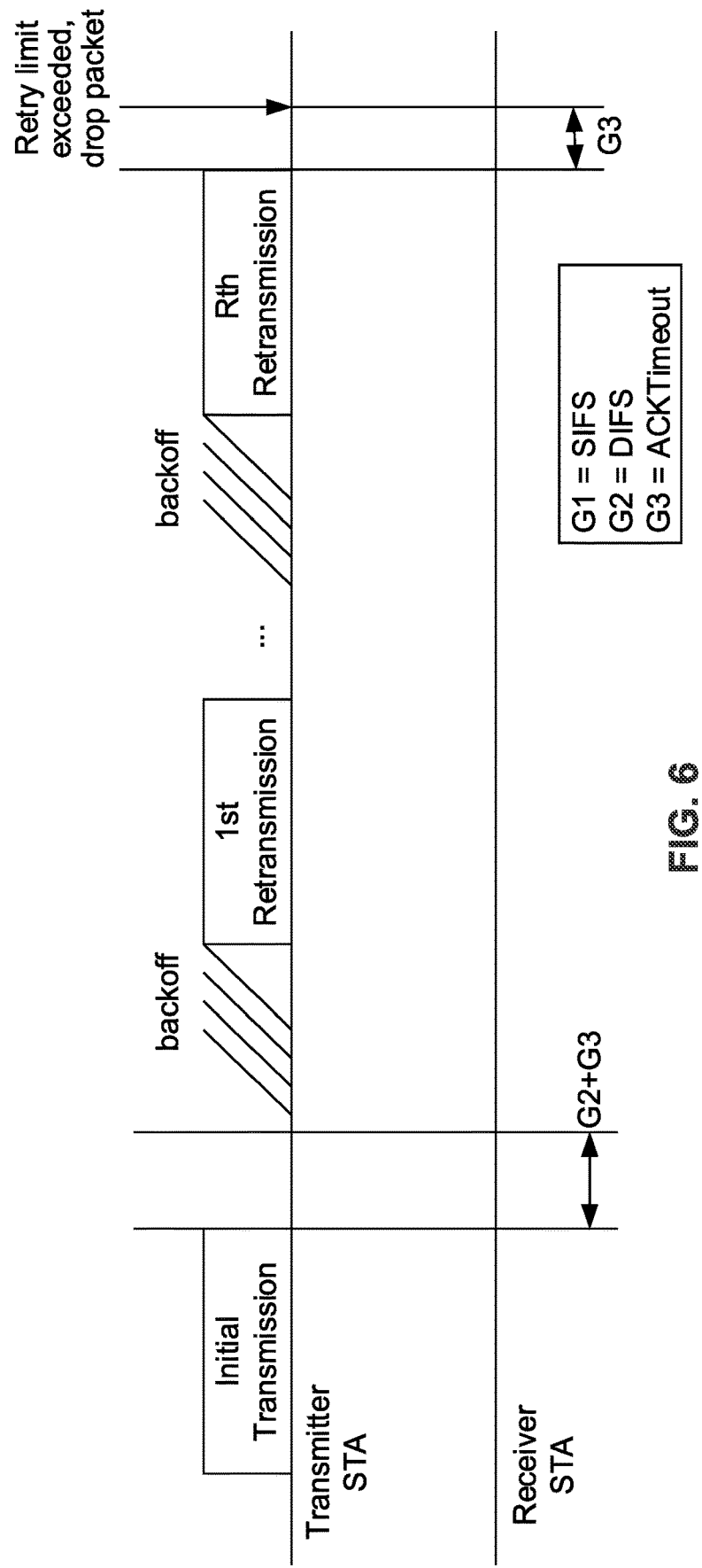
FIG. 6 is a communication diagram of an example in which the packet is dropped after the number of retransmissions exceeds the retry limit.

FIG. 6 illustrates one example in which the packet is dropped after the number of retransmissions exceeds the retry limit. In this example, the retry limit is denoted by "R". The data frame and the ACK frame use the formats as shown in FIG. 2 and FIG. 3, respectively. The frames are packetized using the packet format as shown in FIG. 4. As shown in FIG. 6, after the initial transmission of a packet fails, the transmitter STA retransmits that packet multiple times. However, none of the retransmissions succeed. After retransmitting R times, the number of retransmissions exceeds the retry limit, whereby the transmitter STA stops retransmitting the packet and that packet is dropped.

1.2. EDCA System

Figure 7:
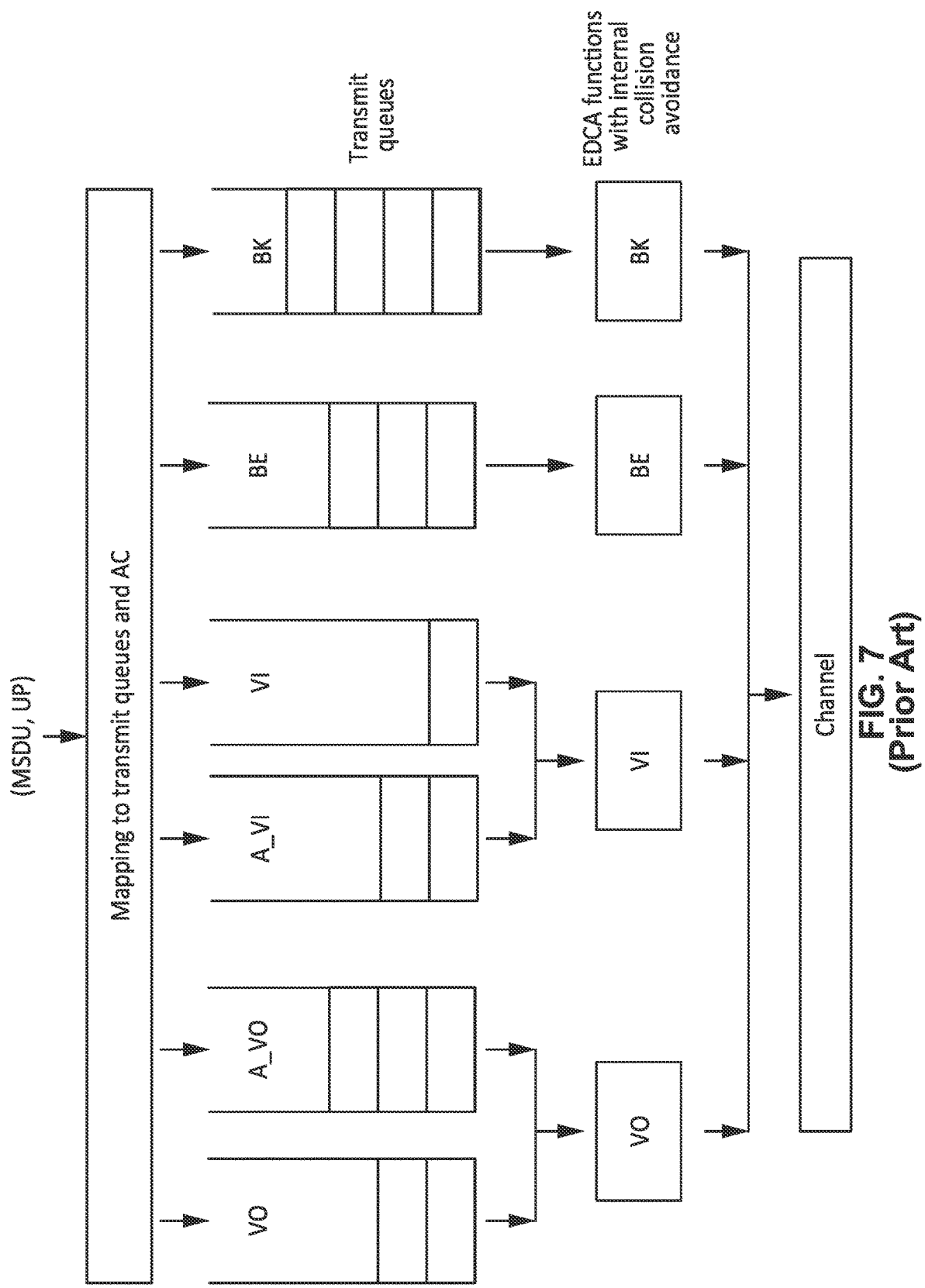
FIG. 7 is a communication diagram of a reference model for an Enhanced DCF Channel Access (EDCA) queue in IEEE 802.11.

FIG. 7 illustrates the reference model of the (Enhanced DCF Channel Access) EDCA queue in IEEE 802.11. The system contains six transmit queues and four access categories (ACs). Each AC uses EDCA functions (EDCAFs) to contend for channel access so that packets in its corresponding transmit queues can be transmitted.

The six transmit queues are voice (VO), alternate voice (A_VO), alternate video (A_VI), video (VI), best effort (BE) and background (BK). Each transmit queue decides the transmission order of the packets in the queue.

The four ACs are voice (VO), video (VI), best effort (BE), and background (BK). Each AC has an EDCA function (EDCAF) to provide the function of channel contention. An internal collision avoidance mechanism is used when multiple EDCAFs try to access the channel at the same time. When an internal collision occurs, the EDCAF with higher priority gains channel access.

Table 1 lists the UP-to-AC mapping used in EDCA queue of IEEE 802.11. The second and third columns represent the user priorities of the traffic and their corresponding designations in IEEE 802.1 D. In each row, according to the user priority, the traffic will be enqueued in the corresponding transmit queue and access category. The priority increases from the top row to the bottom row. The traffic with higher priority has higher probability to be transmitted earlier.

Figure 8:
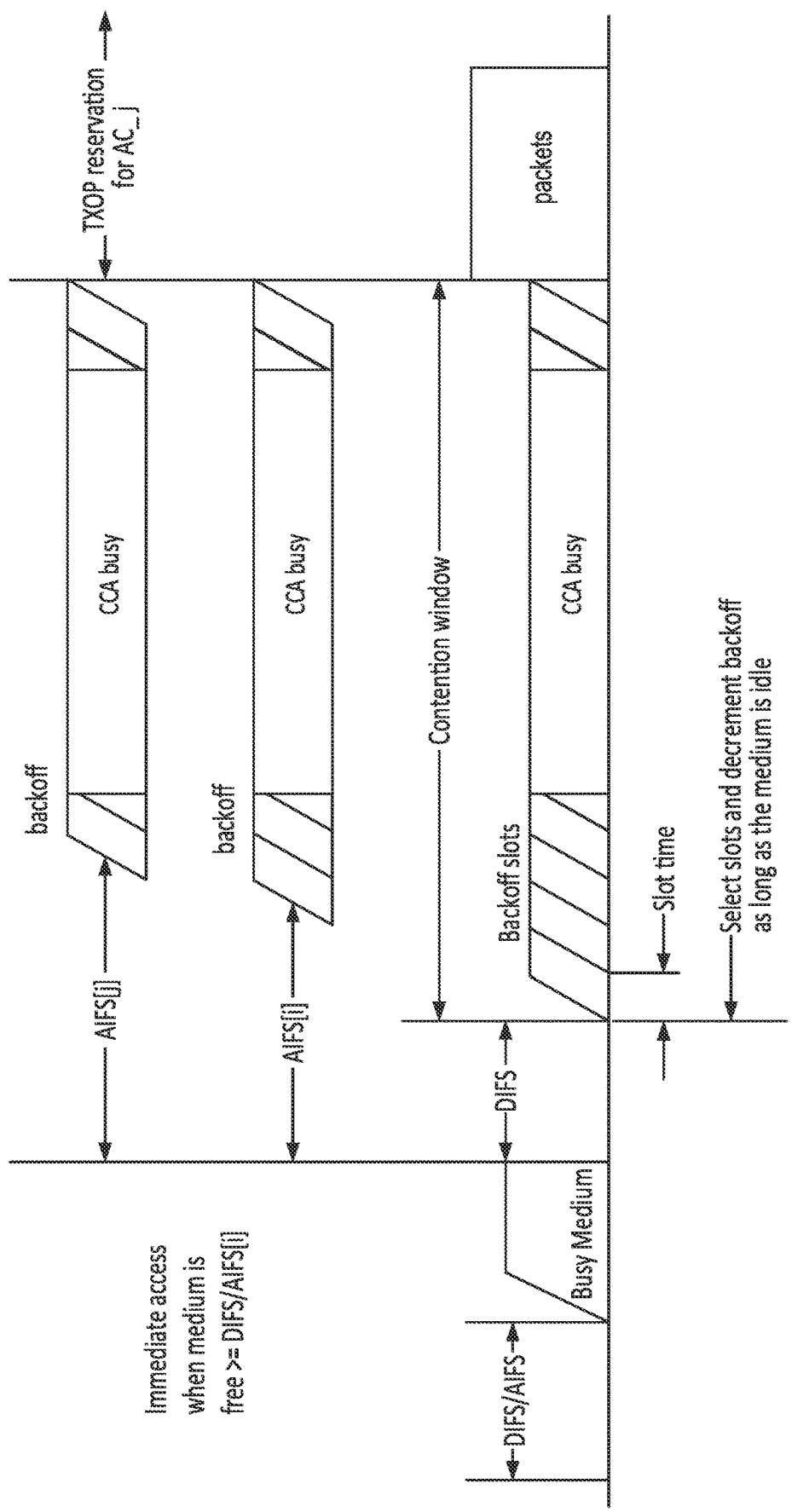
FIG. 8 is a communication diagram of the channel access procedure for EDCA in IEEE 802.1D.

FIG. 8 illustrates the channel access procedure for EDCA. As shown in the figure, it also compares EDCA channel access when only Distributed Coordination Function (DCF) is used.

When only DCF is used, the STA is able to immediately access the channel and the medium is free for more than the DCF Interframe Space (DIFS) time; otherwise, it uses CSMA/CA to contend for the channel. After sensing that the channel is idle for the DIFS time, the STA starts to count down its backoff as long as the medium is idle. The number of backoff slots is randomly chosen between zero and its contention window. The STA pauses to count down the backoff when CCA busy (or medium busy) occurs, for example when the STA senses channel busy. When the backoff count reaches zero, the STA commences transmitting packets.

In EDCA, each EDCAF as shown in FIG. 7 is able to immediately access the channel if the medium is free for more than the DIFS time, or for an Arbitration inter-frame spacing (AIFS) time of the AC as required for gaining channel access. It should be noted that AIFS[i] as shown in the figure represents the AIFS time for AC i. Otherwise, each EDCAF uses CSMA/CA to contend for the channel for each AC that is to obtain channel access. After sensing that the channel is idle for an AIFS time, it commences to count down its backoff while the medium is idle. The number of backoff slots to be counted down is randomly chosen between zero and its contention window size. The STA pauses to count down the backoff when CCA busy (or medium busy) occurs, i.e., when the STA senses that the channel is busy. When the backoff counts down to zero, the STA commences transmitting packets for that AC.

It should be noted that multiple EDCAFs may contend for the channel in parallel. For example, EDCAFs for AC i and AC j can contend for the channel at the same time as shown in FIG. 8. When an internal collision occurs, the EDCAF with higher priority gains channel access and the EDCAF with lower priority will double its contention window. When the AC is either VO or VI, they are able to reserve a period of contention free time, such as a TXOP, for transmitting packets. The maximum duration of the TXOP is denoted as the TXOP limit.

Table 2 lists the default parameter settings for EDCA channel access. Each AC has its own minimum contention window and maximum contention window. AIFSN represents the AIFS duration in terms of the number of backoff slots. The TXOP limit represents the maximum duration of the TXOP that each AC can reserve every time.

1.3. Control Subfield Variants of an A-Control Subfield

Figures 9, 10, 11:
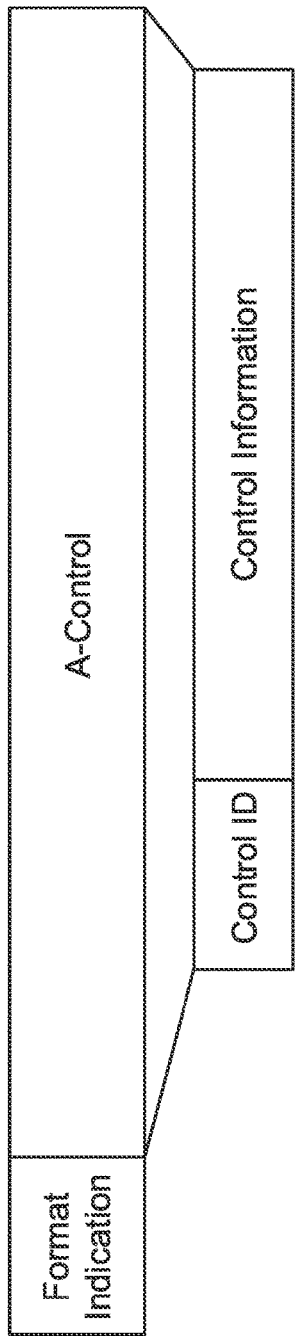
FIG. 9 is a data field diagram depicting an HT control field format for an A-control subfield variant as defined in IEEE 802.11ax.
FIG. 10 is a data field diagram of a control information subfield format if the Control ID field in FIG. 9 indicates that the control information is for BSR.
FIG. 11 is a data field diagram of a control information subfield format if the Control ID field in FIG. 9 indicates that the control information is for CAS.

FIG. 9 illustrates an HT control field format for A-control subfield variant as defined in IEEE 802.11ax. A Format indication field is used to indicate the format of the HT control field. When bits B0 and B1 are set to 1, it indicates the HT control field uses an HE/EHT format. There is an A-Control field followed by this field. An A-Control field carries a buffer status report of different types. A Control ID field indicates the type of the control information subfield. For example, when this bit is set to value "3", then the control information field carries BSR information. A Control Information field carries control information which is indicated in the Control ID field.

FIG. 10 illustrates a control information subfield format if the Control ID field in FIG. 9 indicates the control information is for BSR.

FIG. 11 illustrates a control information subfield format if the Control ID field in FIG. 9 indicates the control information is for CAS.

2. Problem Statement

MLDs may provide the ability of Simultaneous Transmit and Receive (STR), and these MLDs are able to transmit on a link while receiving on any other link simultaneously due to their low in-device coexistence interference. However, non-STR (NSTR) MLDs are unable to safely perform these simultaneous transmissions and receptions. Although both STAs, in either a STR-MLD or a non-STR MLD, can simultaneously transmit, or simultaneously receive.

The present disclosure considers channel contention performed by Multi-Link Devices (MLDs) using CSMA/CA over NSTR link pairs. For a MLD, the in-device coexistence interference is high between the links of its NSTR link pair, for example the interference due to the signal transmission by a STA of the MLD on a link of the NSTR link pair can impede or prevent signal reception by another STA of the same MLD on the other link of the NSTR link pair. Accordingly, the MLD should not transmit on a link of its NSTR link pair while it is simultaneously receiving on the other link of its same NSTR link pair.

Figure 12:
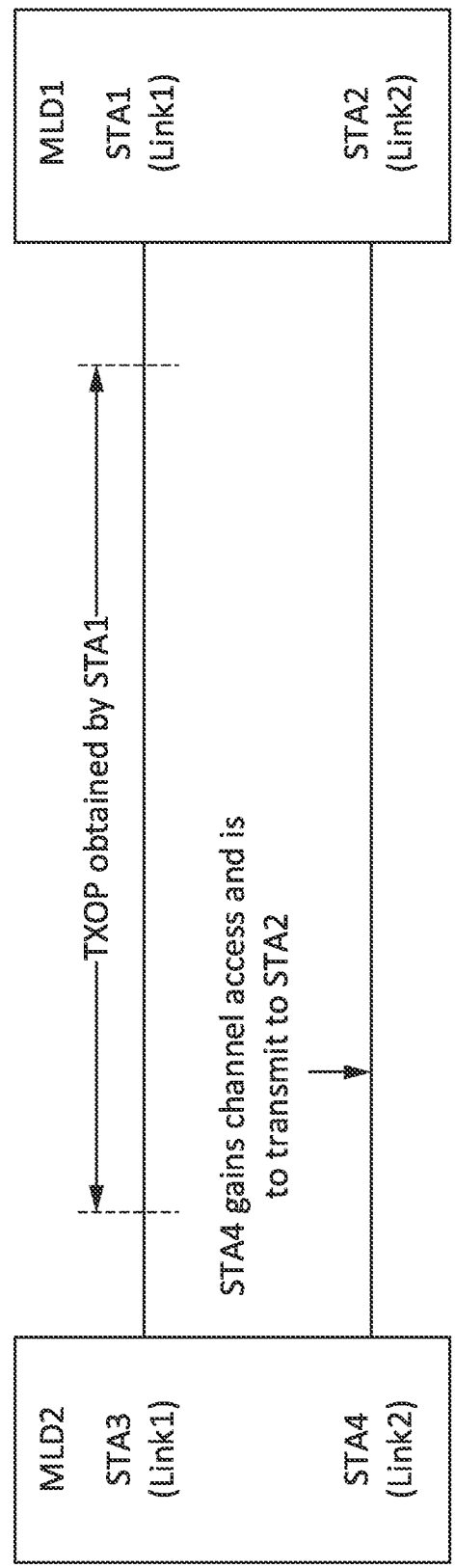
FIG. 12 is a communication diagram of an issue that can arise with communication over an NSTR link pair.

FIG. 12 illustrates issues that can arise when a STR MLD is communicating with a NSTR MLD over the NSTR link pair of an NSTR MLD. An example of this scenario is discussed in a later section, in which MLD1 is the NSTR MLD and Link1 and Link2 are one NSTR link pair of MLD1.

Referring to FIG. 12, a problem can arise when STA1 affiliated with MLD1 is the TXOP holder on Link1, and STA4 affiliated with MLD2 gains channel access on Link2 for transmitting to STA2. STA3 can determine that STA1 is the TXOP holder on Link1 and monitor the status of STA1, for instance to determine whether STA1 is transmitting or receiving. If STA1 is transmitting and STA4 accesses the channel immediately, and transmits to STA2, then a transmission collision can occur due to the in-device coexistence interference between NSTR links. If STA4 does not access the channel immediately, it may no longer access the channel after STA1 finishes transmission on Link1. The simplest solution is to forbid STA4 to access the channel on Link2. However, this conventional technique reduces the efficiency of the transmission. Therefore, the teachings of the present disclosure, allow for a STA (e.g., STA4) of a non-STR MLD to access the channel and communicate with STA2, which results in wider bandwidth, higher throughput and lower latency. Yet a simple implementation this process can also create issues.

Specifically, issues arise to the manner in which STA4 notifies STA2 or MLD1 that it is the TXOP holder on Link2. STA4 has to occupy the channel immediately after it accesses the channel. However, when STA4 accesses the channel, it is possible that STA1 may be transmitting on Link1. Then, MLD1 (i.e., STA2 affiliated with MLD1) is not able to receive communications from STA4.

Since the TXOP holders on Link1 and Link2 are different, in-device coexistence interference (IDC) can often arise when the transmission directions of the two links are different. Thus, the present disclosure describes a process for arranging the transmissions on Link1 and Link2.

3. Contribution of the Present Disclosure

The present disclosure teaches a protocol (apparatus/method) to allow a STA of a non-STR MLD (e.g., STA4) to occupy the channel even when it is not allowed to transmit (e.g., to STA2) immediately after obtaining channel access (e.g., on Link2).

The disclosed CSMA/CA WLAN protocol allows either of the MLDs (e.g., MLD1 or MLD2) to arrange transmissions over the two links simultaneously, although the TXOP holders on the two links are from different MLDs.

4. Hardware Embodiments

4.1. STA and MLD Hardware Configuration

Figure 13:
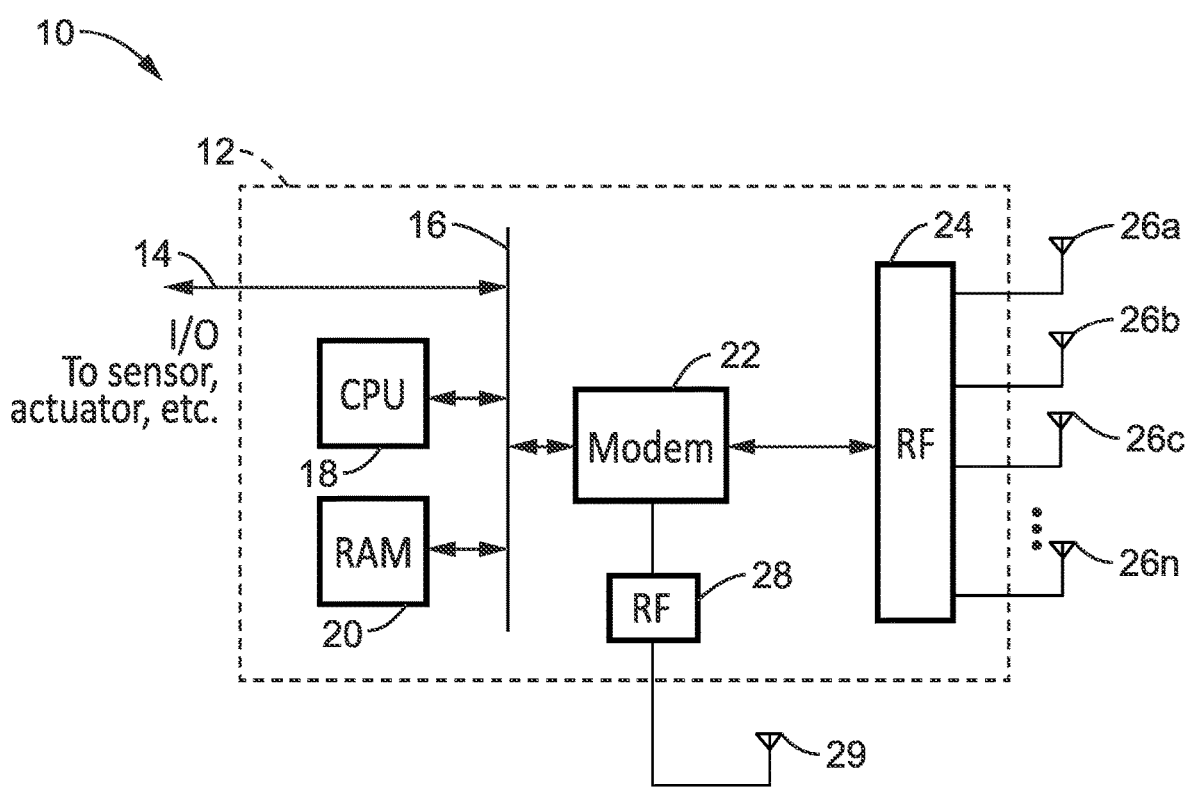
FIG. 13 is a hardware block diagram of wireless station (STA) hardware according to at least one embodiment of the present disclosure.

FIG. 13 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implement the communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with the other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. The present disclosure is primarily directed at the sub 6 GHz band.

It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware as shown in the figure, can be combined into a multi-link device (MLD), which typically will have a processor and memory for coordinating the activity of the stations.

Figure 14:
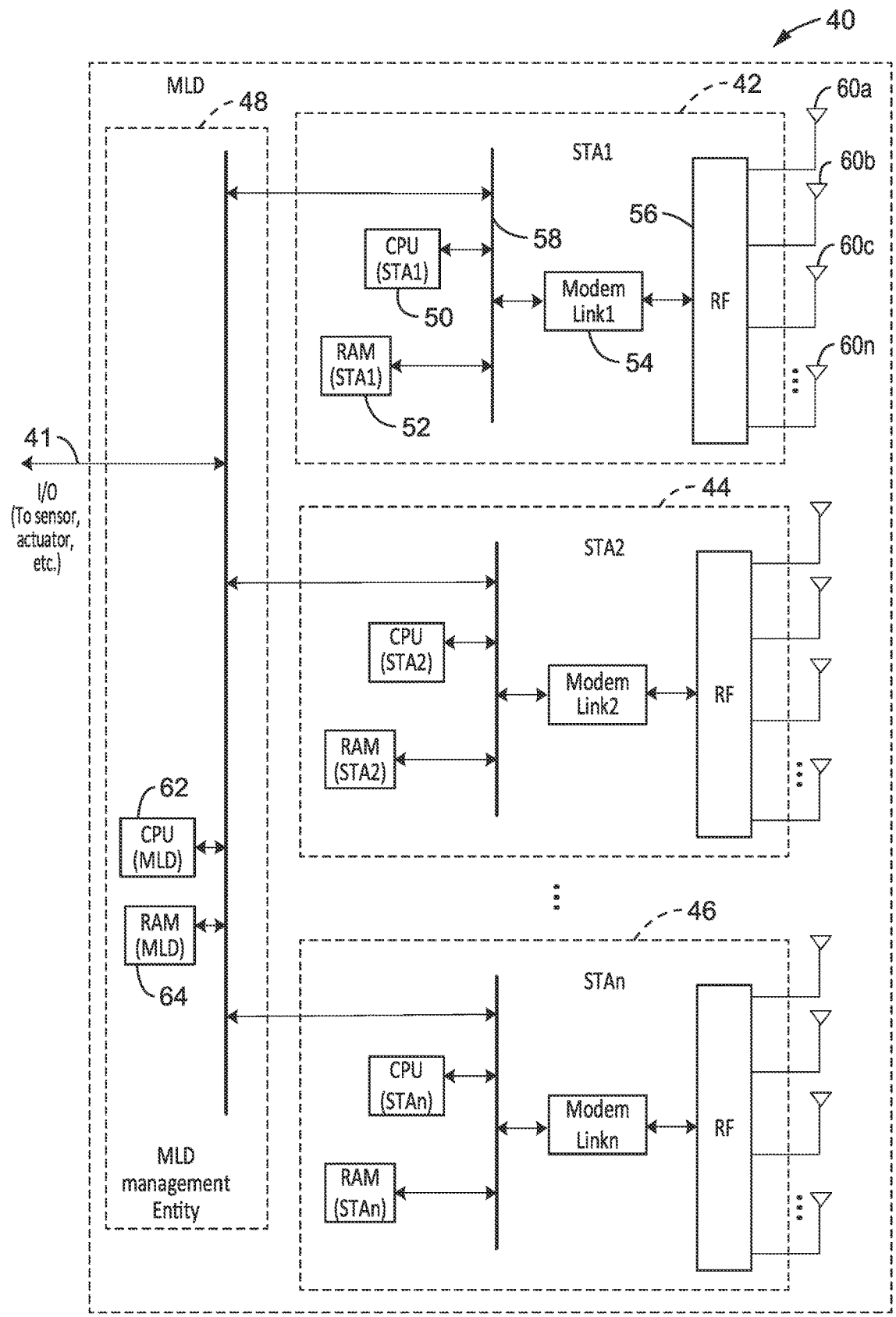
FIG. 14 is a hardware block diagram of a station configuration, such as contained in Multi-Link Device (MLD) hardware, according to at least one embodiment of the present disclosure.

FIG. 14 illustrates an example embodiment 40 of a Multi-Link Device (MLD) hardware configuration. There are two links with the MLD which are known as the primary link and a conditional link. The conditional link is a link that forms a non-simultaneous transmission and reception (NSTR) link pair with some basic link(s).

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implements communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60a, 60b, 60c through 60n, such as in an antenna array. The modem in combination with the RF circuit and associated antenna(s) transmits/receives data frames with neighboring STAs. In at least one implementation, the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

4.2. STA Topology for Example Use

Figure 15:
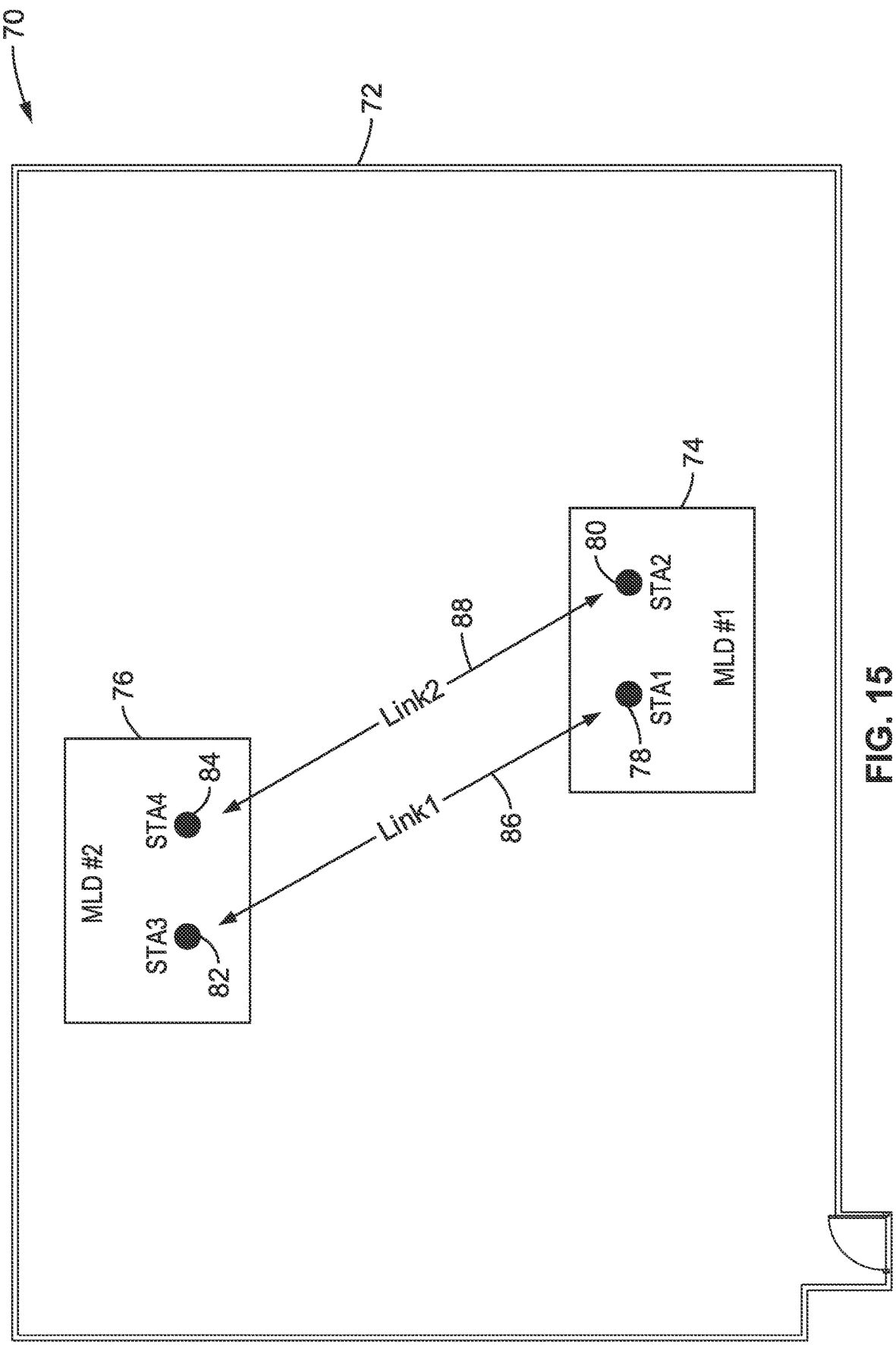
FIG. 15 is a network topology of general multiple link connections according to at least one embodiment of the present disclosure.

FIG. 15 illustrates an embodiment 70 of an example network topology utilized for explaining the goals of the present disclosure. It should be appreciated that this topology (and all topologies exemplified herein) is depicted by way of example, and not by way of limitation, as the apparatus and method of the present disclosure is not limited to any specific topologies. In addition, the specific MLD, STA and Link references throughout the present disclosure are provided only to simplify the understanding of operations. It will be noted that Link1 and Link2 are one NSTR link pair of MLD1.

A multi-link device (MLD) is a device that has multiple affiliated STAs (typically two) and has one MAC service access point (SAP) to logical link control (LLC), which includes one MAC data service. An MLD is considered an AP MLD if the STAs of the MLD are AP STAs; otherwise, an MLD is a non-AP MLD if non-AP STAs are affiliated with that MLD.

As shown in the example figure it is assumed these STAs on two MLDs 74, 76 are within a structure 72, such as a meeting room. STA1 78 and STA2 80 are affiliated with MLD1, while STA3 82 and STA4 84 are affiliated with MLD2. STA1 and STA2 are associated with STA3 and STA4 over Link1 86 and Link2 88, respectively.

It will be recognized that in certain instances Link1 and Link2 will be an NSTR link pair, such as of MLD1, as exemplified in the operational demonstration of the present disclosure in such NSTR situations. It will be noted that all STAs use CSMA/CA for random channel access on all the links. In this specific example topology, MLD1 is considered a NSTR MLD while MLD2 is considered a STR MLD. Link1 and Link2 are one NSTR link pair of MLD1. STA1 is communicating with STA3 over Link1 and STA2 is communicating with STA4 over Link2. The network topology as shown in the figure can represent the following two scenarios: (a) MLD2 is a STR AP MLD and MLD1 is a NSTR non-AP MLD, or (b) MLD1 is a soft-AP and MLD2 is a STR non-AP MLD.

It will be noted that the term "soft-AP" is an abbreviated term for "software enabled access point" or "NSTR mobile AP MLD"; in which software enables the STA to be an AP; as the station hardware may be the same as a regular (non-AP) STA.

In the network topology shown in the figure, it is assumed that MLD2 can determine the transmitting and receiving status of STA1 on Link1 since STA3 affiliated with MLD2 is transmitting or receiving with STA1 on Link1. Then, MLD2 can share the status information of STA1 on Link1 with its affiliated STA4 on Link2.

4.3. Channel Access on NSTR Link

This section explains how STA4 accesses the channel on Link2 when STA1 is the TXOP holder on Link1. In order to simplify the explanation, the network topology shown in FIG. 15 is used in the flowcharts and communication examples.

4.3.1. Channel Access Process

Figure 16:
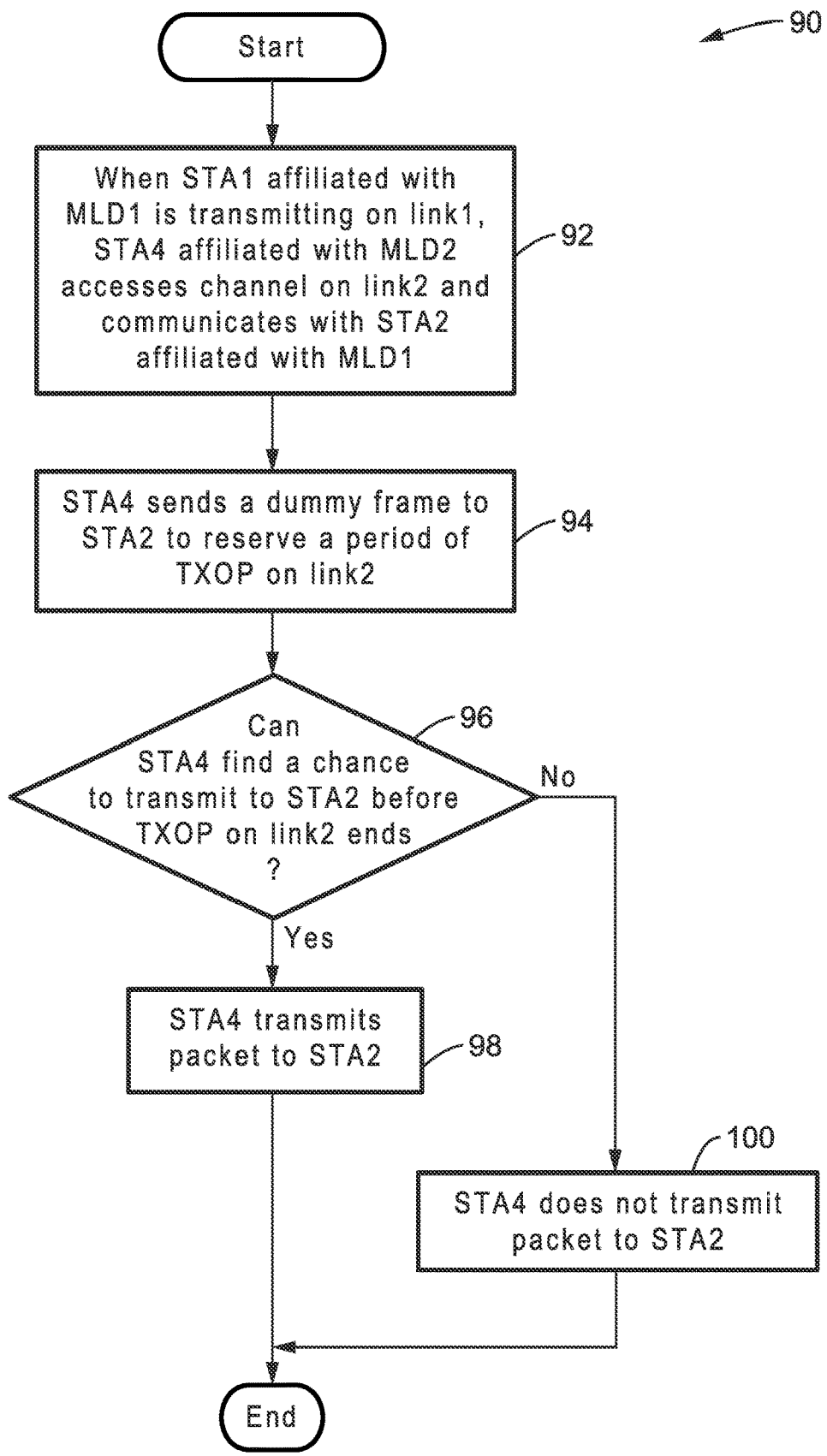
FIG. 16 is a flow diagram of channel access by STA4 on Link2 when STA1 is transmitting on Link1 according to at least one embodiment of the present disclosure.

FIG. 16 illustrates an example embodiment 90 of channel access by STA4 on Link2 when STA1 is transmitting on Link1.

Figures 22, 23:
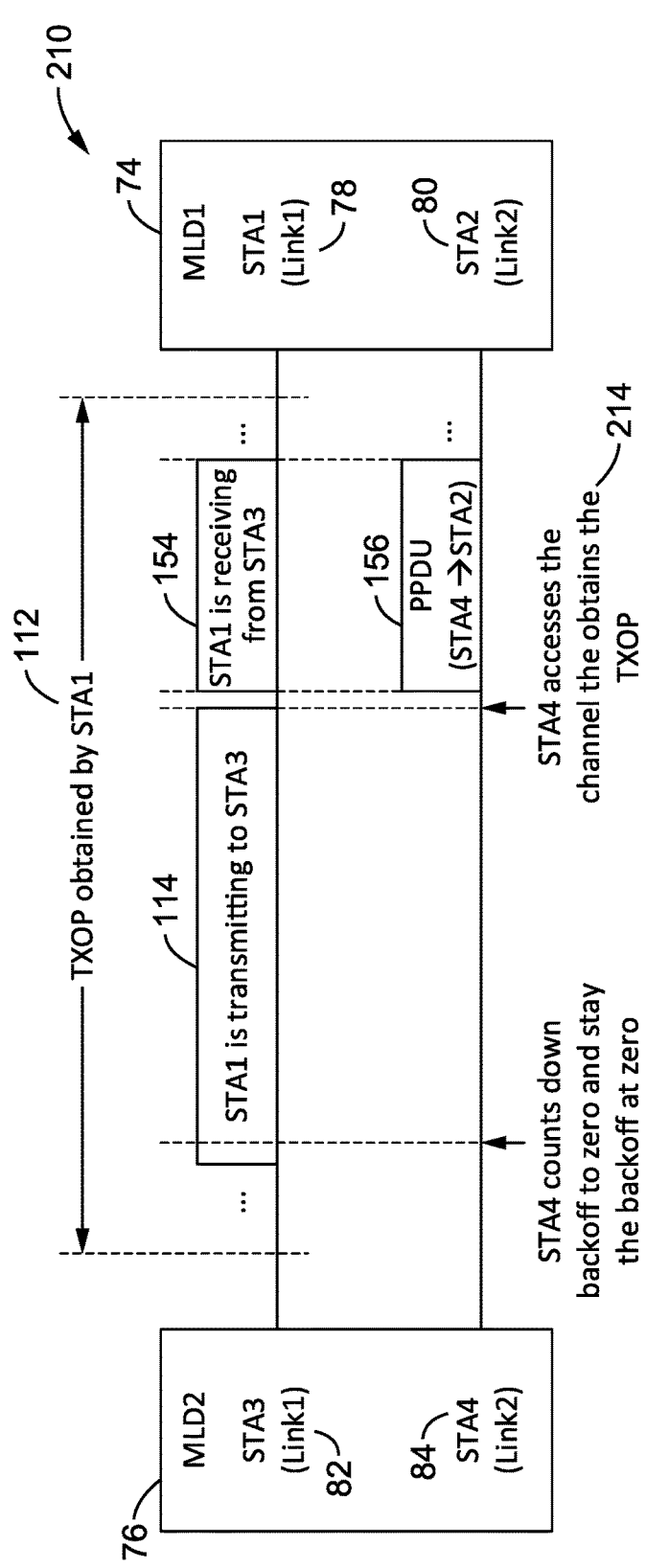
FIG. 22 is a communication diagram of STA4, waiting with its backoff at zero, to communicate with an intended receiver on Link2 according to at least one embodiment of the present disclosure.
FIG. 23 is a data field diagram depicting a Sharing frame according to at least one embodiment of the present disclosure.

When STA1 affiliated with MLD1 is transmitting 92 on Link1, STA4 affiliated with MLD2 accesses the channel on Link2 and communicates with STA2 affiliated with MLD1. In the case of Link1 and Link2 being a NSTR link pair of MLD1, STA2 may not be able to receive (hear) from STA4 on Link2 when STA1 is transmitting on Link1. Thus, in block 94, STA4 sends a dummy frame, such as a short frame without a DATA packet, to STA2 to reserve a period of TXOP on Link2. It should be noted that STA4 can broadcast the dummy frame. The dummy frame may be created in numerous forms, such as a Ready-To-Send (RTS), a Multi-User RTS (MU-RTS), MU-RTS TXOP Sharing (TXS) frame, Clear-to-Send (CTS), CTS-to-Self frame, or other sharing frame for example as shown in FIG. 23. The reserved TXOP time requested by the dummy frame occupies the channel until STA2 is able to receive from STA4 on Link2, after which STA4 can transmit a frame to STA2 immediately.

Check 96 determines if STA4 has an opportunity (chance) to transmit to STA2 (e.g., STA2 is receiving) before the end of TXOP reserved by the dummy frame. If the condition is met, then STA4 transmits 98 packets to STA2.

Otherwise, STA4 does not 100 transmit packets to STA2. As a result, STA4 may commence a new backoff immediately, or in some cases will not launch a new backoff until the end of TXOP of STA1, or it may start a new backoff when it has packets to transmit to other STAs, or retains the backoff count at zero.

4.3.2. Link Access Examples

Figures 32, 33, 34:
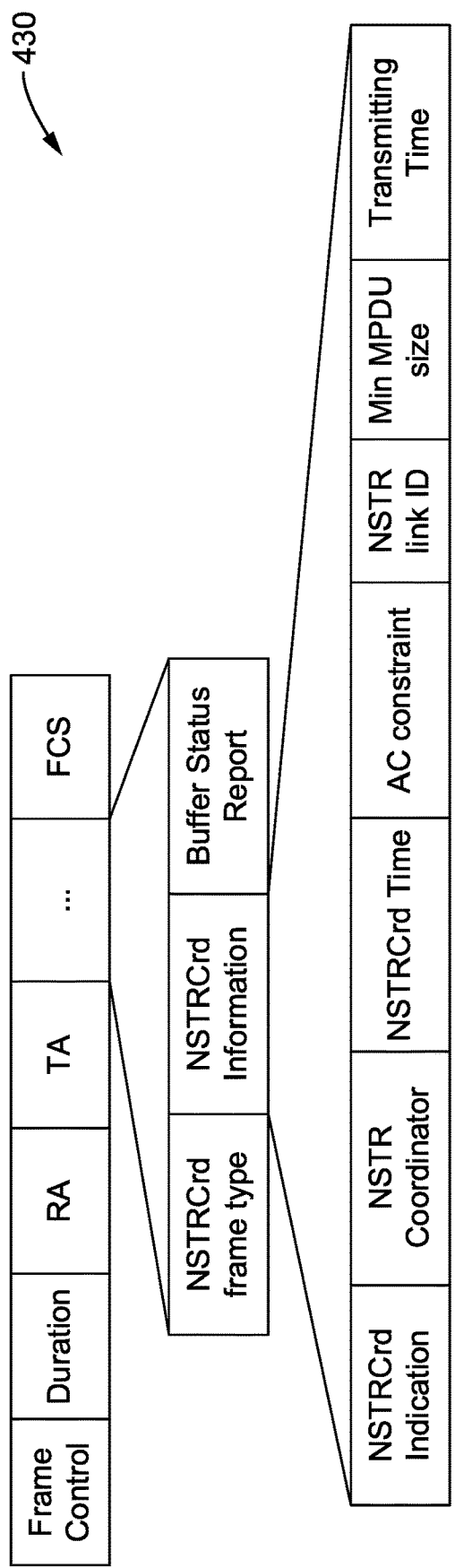
FIG. 32 is a data field diagram depicting the NSTR coordination request, response and indication frame according to at least one embodiment of the present disclosure.
FIG. 33 is a data field diagram depicting a Ready-to-Forward (RTF) frame according to at least one embodiment of the present disclosure.
FIG. 34 is a data field diagram depicting extended CAS control subfield variants of an A-control subfield according to at least one embodiment of the present disclosure.

This section provides several examples to demonstrate STA4 accessing the channel on Link2 when STA1 is the TXOP holder on Link1. This facilitates a wider channel communication bandwidth between the MLDs (i.e., MLD1 and MLD2), which results in higher throughput and lower latency. It should be noted that PPDU (STA4 to STA2) as shown in the examples in this section may comprise a NSTRCrd Request/Indication frame (e.g., as seen in FIG. 32 through FIG. 34) or a PPDU with RDG=1 and NSTR coordination indication set to a first state (e.g., "1") as shown in Section 4.4 which launches a NSTR coordination.

In the examples shown in this section, it is assumed that MLD2 can determine the transmitting and receiving status of STA1 on Link1 since STA3 affiliated with MLD2 is transmitting or receiving with STA1 on Link1. Then, MLD2 shares the status information of STA1 on Link1 with its affiliated STA4 on Link2.

Figure 17:
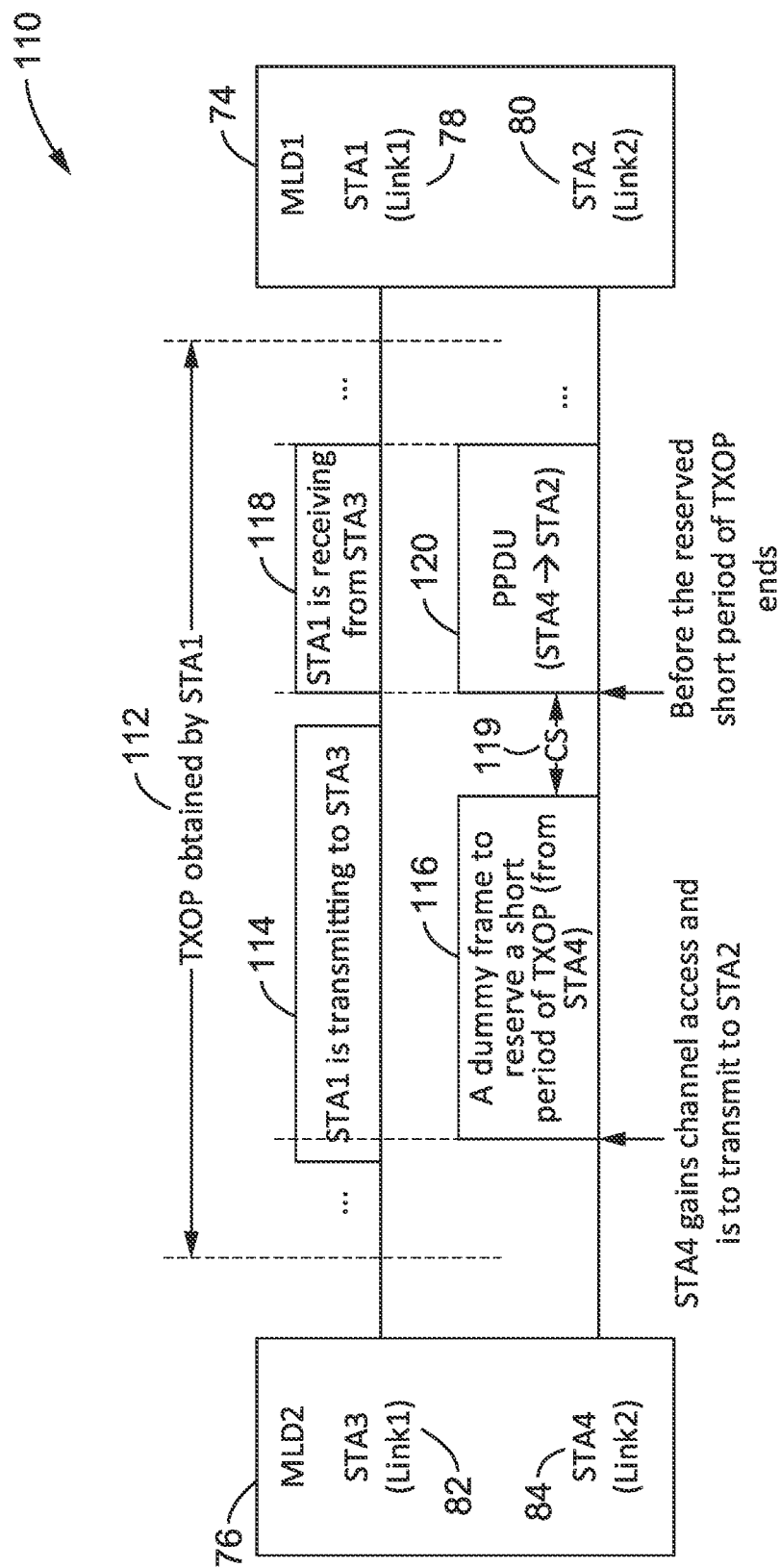
FIG. 17 is a communication diagram of STA4 using a dummy frame to reserve TXOP on Link2 according to at least one embodiment of the present disclosure.

FIG. 17 illustrates an example embodiment 110 of STA4 using a dummy frame to reserve TXOP on Link2. The figure depicts MLD2 76 with its associated STA3 82 and STA4 84, which communicate with MLD1 74 having associated STA1 78 and STA2 80.

TXOP 112 is obtained on Link1 by STA1, and STA1 commences transmitting 114 to STA3 on Link1. Then STA4 obtains channel access to transmit to STA2, while STA1 is transmitting on Link1. STA4 transmits a dummy frame 116 to reserve a short period of the TXOP. Before the end of the reserved short period of the TXOP, STA1 completes its transmissions and starts receiving 118 over Link1 from STA3. When STA1 is receiving, then STA4 is able to transmit a PPDU(s) 120 to STA2, with assurance that STA2 reception will not be blocked by in-device coexistence interference.

It should be noted that PPDU alignment between two links may not be necessary; although the directions of the PPDU transmission on the two links should be aligned. Stated another way, the directions of the PPDU transmission on the two links should be either both UL or both DL at the same time). It is possible that the transmission information (preamble and the MAC header of PPDUs) on Link1 could aid STA4 to transmit PPDU (STA4 to STA2) when STA1 is receiving.

During the time between the dummy frame and the PPDU from STA4 to STA2 on Link2, STA4 may need to perform carrier sensing (CS) 119 to sense channel status. If the channel becomes busy during that time, STA4 may not be able to transmit PPDU from STA4 to STA2 and start a new channel contention.

It should be noted that MLD2 is an STR MLD. STA4 thus can start and end the PPDU transmissions (e.g., may include multiple PPDUs) to STA2 within the time during which STA4 is receiving on Link1.

Figure 18:
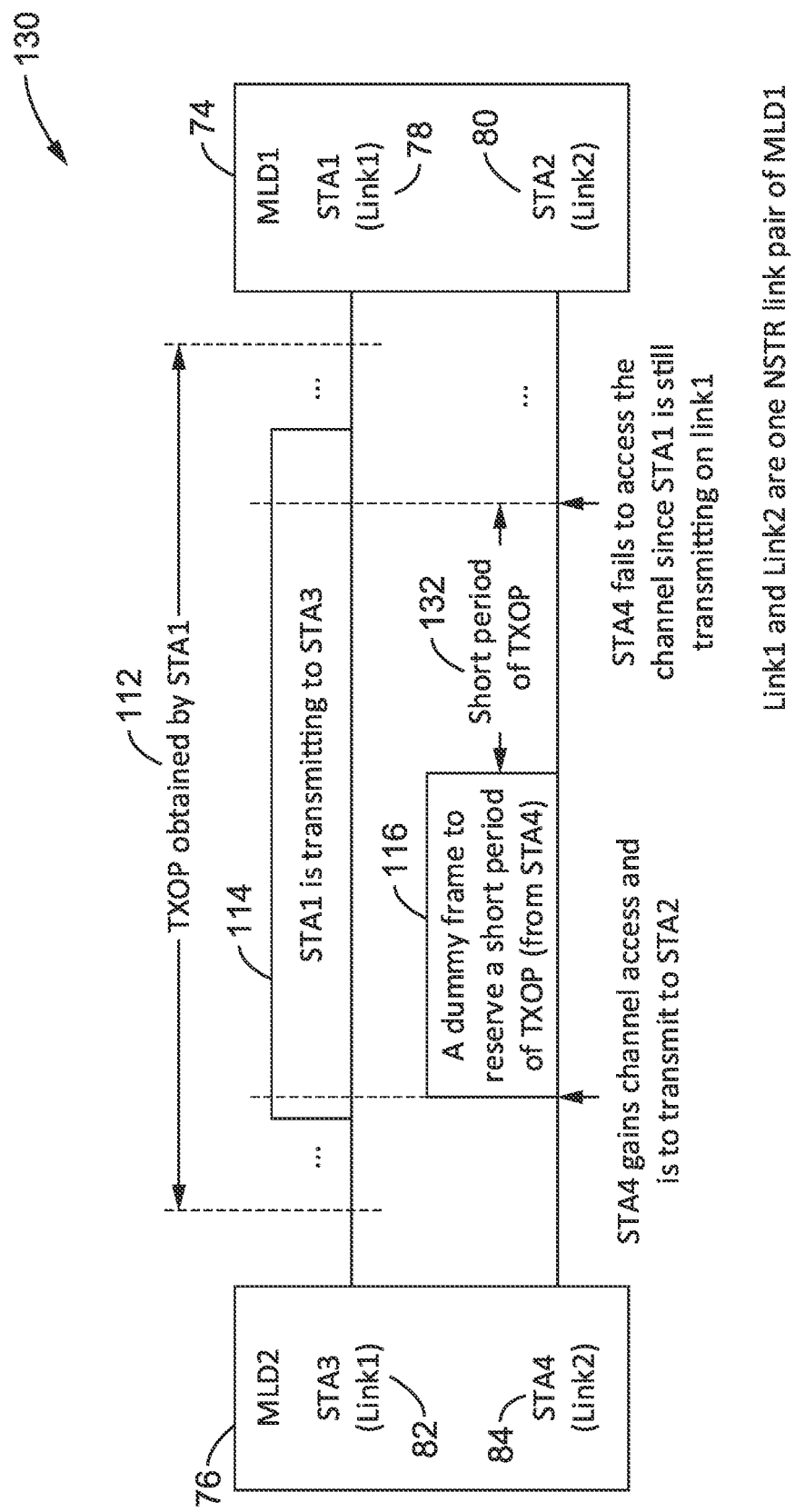
FIG. 18 is a communication diagram of in which STA4 uses a dummy frame to reserve TXOP on Link2, but lacked an opportunity to transmit to STA2 during the reserved TXOP according to at least one embodiment of the present disclosure.

FIG. 18 illustrates an example embodiment 130 in which STA4 uses a dummy frame to reserve TXOP on Link2, but lacked an opportunity to transmit to STA2 during the reserved TXOP. In this case, when STA1 was transmitting on Link1, it was transmitting multiple PPDUs sequentially. The MLDs, STAs and links are the same seen in FIG. 17.

Again, STA1 is seen obtaining 112 the TXOP, and commencing transmissions 114 to STA3. Then while STA1 is transmitting on Link1, STA4 obtains channel access to Link2 for transmitting to STA2, and transmits 116 a dummy frame to reserve a short period of TXOP. Within the reserved short period 132 of TXOP, STA1 is still transmitting on Link1; whereby STA4 is unable to send a PPDU to STA2 that can be heard by STA2. Therefore, STA4 does not send any PPDU to STA2 during the short period of TXOP and fails to access the channel.

After the short period of TXOP, STA4 may re-contend for the channel. In this case, in at least one embodiment/mode/case STA4 pursues channel access without increasing the Contention Window (CW) for the channel.

Figure 19:
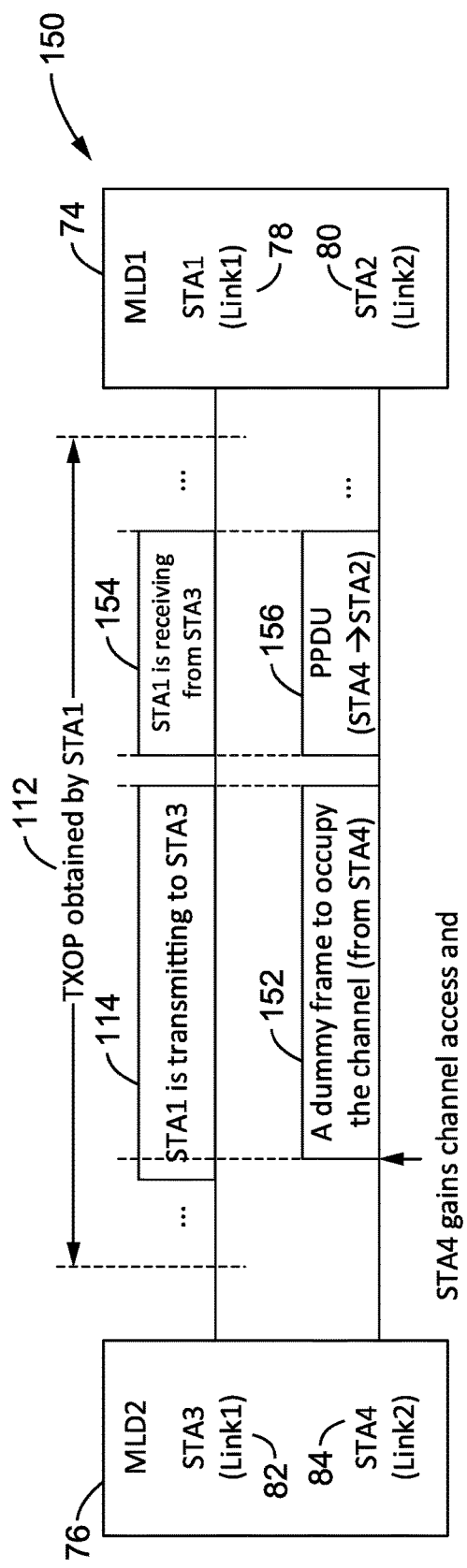
FIG. 19 is a communication diagram of STA4 using a dummy frame to occupy the channel on Link2 according to at least one embodiment of the present disclosure.

FIG. 19 illustrates an example embodiment 150 of STA4 using a dummy frame to occupy the channel on Link2. The MLDs, STAs and links are the same as seen in FIG. 18.

Again, STA1 is seen obtaining 112 the TXOP, and commencing transmissions 114 to STA3. Then while STA1 is transmitting on Link1, STA4 obtains channel access to Link2 for transmitting to STA2, and transmits 152 a dummy frame to occupy the channel for transmitting to STA2.

In this example, STA4 aligns the end time of dummy frame 152 to the end time of STA1 transmission. This can be achieved as STA4 can determine the time when STA1 ends transmitting, such as based on the PPDU length information from STA3. The dummy frame may include padding in the frame to achieve alignment.

After STA1 finishes transmitting and starts receiving 154 on Link1, STA4 is able to send a PPDU (or PPDUs) 156 to STA2 and it is assured there is no in-device coexistence interference to block it from being heard by STA2. It should be noted that PPDU alignment between two links may not be necessary when STA4 sends PPDU(s) to STA2; for example, if the direction of the PPDU transmission on the two links is properly aligned.

During the time between the dummy frame and the PPDU from STA4 to STA2 on Link2, STA4 may need to perform carrier sensing (CS) to determine channel status. If the channel becomes busy during that time, STA4 may not be able to transmit PPDU(s) from STA4 to STA2 and begin a new channel contention.

Figure 20:
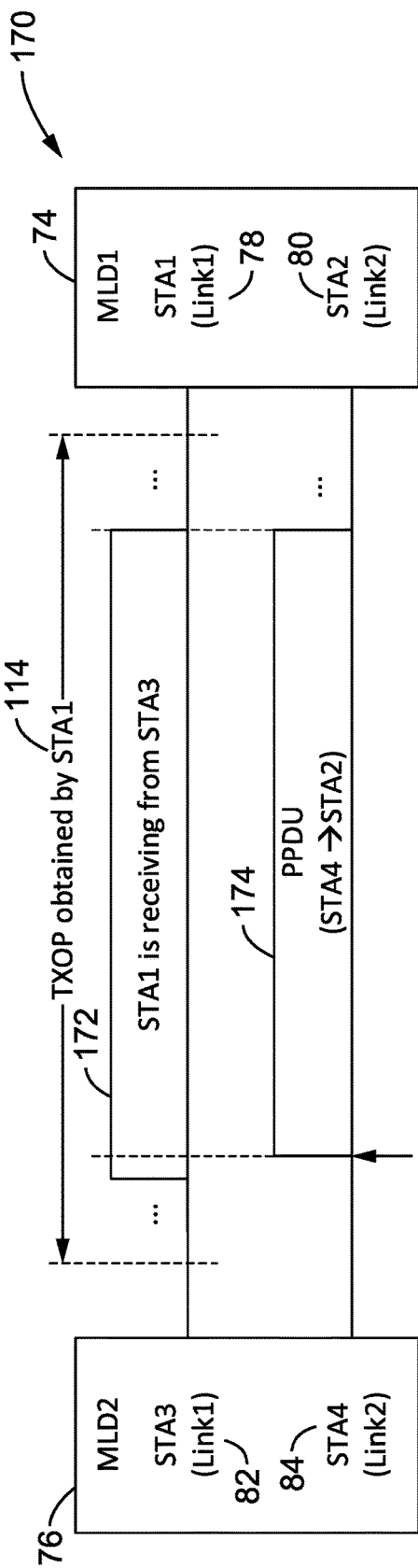
FIG. 20 is a communication diagram of STA4 sending PPDU to STA2 on Link2 immediately after it accesses the channel according to at least one embodiment of the present disclosure.

FIG. 20 illustrates an example embodiment 170 of STA4 sending PPDU to STA2 on Link2 immediately after it accesses the channel. The MLDs, STAs and links are the same as seen in FIG. 19.

STA1 is seen obtaining 112 the TXOP, and commencing to receive 172 transmissions from STA3. Then, while STA1 is receiving on Link1, STA4 obtains channel access to Link2 for transmitting to STA2, and transmits PPDU(s) 174 to STA2, without any delays necessary for preventing interference, and thus STA4 PPDU is immediately received by STA2.

Figure 21:
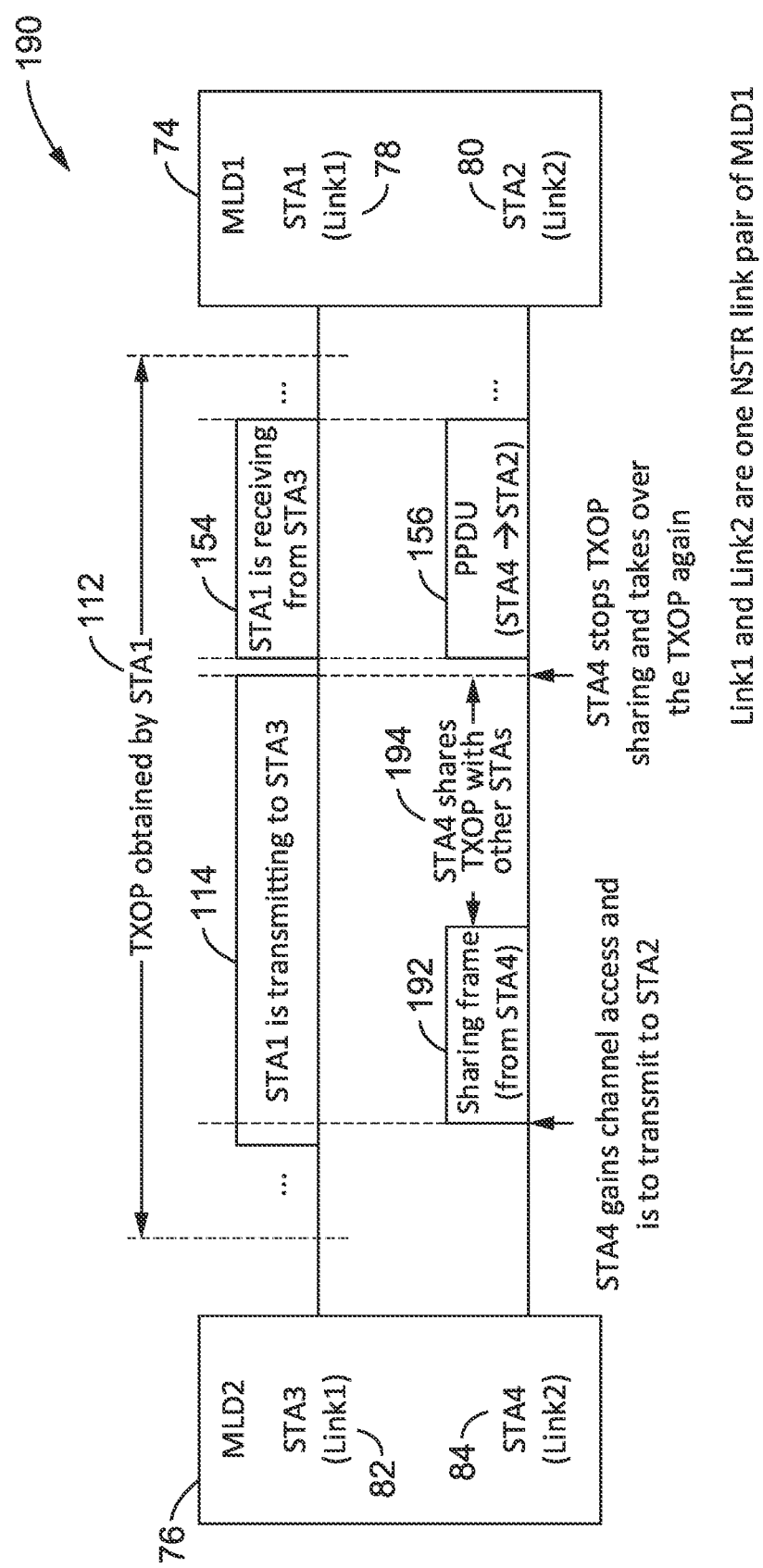
FIG. 21 is a communication diagram of STA4 using a sharing frame to reserve TXOP on Link2 according to at least one embodiment of the present disclosure.

FIG. 21 illustrates an example embodiment 190 of STA4 using a sharing frame to reserve TXOP on Link2. The MLDs, STAs and links are the same as seen in FIG. 17.

Again, STA1 is seen obtaining 112 the TXOP, and commencing transmissions 114 to STA3. Then while STA1 is transmitting on Link1, STA4 obtains channel access to Link2 for transmitting to STA2, and transmits a sharing frame 192, as shown in FIG. 23, to allow other STAs to share the TXOP. Then while STA1 is still transmitting 114 to STA3, STA4 shares 194 the TXOP with other STAs.

Before STA4 is able to send a PPDU to STA2 (i.e., PPDU STA4 to STA2 in the figure), it shares the TXOP with other STAs. That is, the other STAs are able to transmit during the shared TXOP time (i.e., the time between the sharing frame and PPDU STA4 to STA2). The shared TXOP time can be obtained, for example, from the TXOP sharing time field in the sharing frame. The transmissions of the other STAs are not allowed to exceed the TXOP sharing time. Then, STA4 stops TXOP sharing and transmit packets 156 to STA2.

It should be noted that PPDU alignment between two links may not be necessary when STA4 sends PPDU(s) to STA2; for example, in a situation in which the direction of PPDU transmissions on the two links are aligned.

It at least one embodiment/mode/case the sharing frame is replaced by an Multi-User (MU) RTS TXOP Sharing (TXS) frame. It is also allowable for STA4 to sends a trigger frame instead of the sharing frame, as to trigger some transmissions before it starts the transmission with STA2. It is allowable for STA4 to exchange frames with other STAs before it commences transmission to STA2.

FIG. 22 illustrates an example embodiment 210 of STA4 waiting backoff at zero to communicate with intended receiver on Link2. The MLDs, STAs and links are the same as seen in FIG. 17.

Again, STA1 is seen obtaining 112 the TXOP, and commencing transmissions 114 to STA3. Then while STA1 is transmitting on Link1, STA4 counts down its backoff (BO) to zero for Link2, and maintains the BO count at zero, as described for FIG. 23, while STA1 is transmitting on Link2.

When STA4 is able to send a PPDU to STA2 (i.e., PPDU STA4 to STA2 in the figure), it accesses the channel 214 and sends PPDU(s) 156 to STA2.

It should be noted that PPDU alignment between two links may not be necessary when STA4 sends PPDU to STA2; such as when the direction of the PPDU transmission on the two links is aligned.

3.3.3. Frame Formats

FIG. 23 illustrates an example embodiment 230 of a Sharing frame, having the following fields.

The Frame Control field indicates the type of frame. A Duration field contains NAV information used for CSMA/CA channel access. An RA field contains an address for the recipient of the frame. This RA field can be broadcast as well. A TA field contains the address of the STA that transmitted the frame.

TXOP sharing information fields. Other STAs may contend for the channel to obtain a TXOP, however, they are required to end their TXOP (no transmissions beyond the TXOP) before the TXOP sharing ends. A TXOP sharing Indication field indicates whether TXOP sharing is allowed. This field may consist of a one bit indication (flag); for example, if the field is set to a first state (e.g., "1"), then TXOP sharing is allowed. When this field is set to a second state (e.g., "0"), then TXOP sharing is not allowed. When the receiver STA receives this field, it recognizes that it may transmit during the TXOP sharing time if the field is set to the TXOP sharing state. TXOP sharing Time field indicates the time that the receiver STA may use to transmit after receiving this frame. The transmission of the receiver STA should not exceed the TXOP sharing time. If the RA is broadcast, the receiver STAs contend for the channel before transmitting.

Access Class fields are included. An AC constraint field indicates whether only the ACs specified in the ACI field can be transmitted during the TXOP sharing time. This field may comprise a one bit indication; for example, as set to a first state (e.g., "1"), the receiver STA can only transmit the traffic from the ACs specified in the ACI field. Otherwise, the STA can transmit traffic from all the ACs. An ACI field indicates the ACs whose traffic can be transmitted during the TXOP sharing time. The format of this field can be the same as the ACI bitmap field or ACI High field shown in FIG. 10.

4.4. Coordination on Links of NSTR Link Pair

In order to simplify discussion of the examples, the network topology shown in FIG. 15 is used in the flowchart and examples.

This section explains the manner in which STA4 requests coordination of transmissions on both Link1 and Link2, denoted as NSTR coordination, when STA1 and STA4 are the TXOP holders on Link1 and Link2, respectively. When a NSTR coordination of the transmission occurs, either MLD1 or MLD2 arranges the transmissions (i.e., acts as TXOP holder) on both links simultaneously. Then, the MLD which arranges the transmissions can transmit or receive on the two links simultaneously to avoid in-device coexistence (IDC) interference between the two links.

4.4.1. NSTR Request Process

Figure 24:
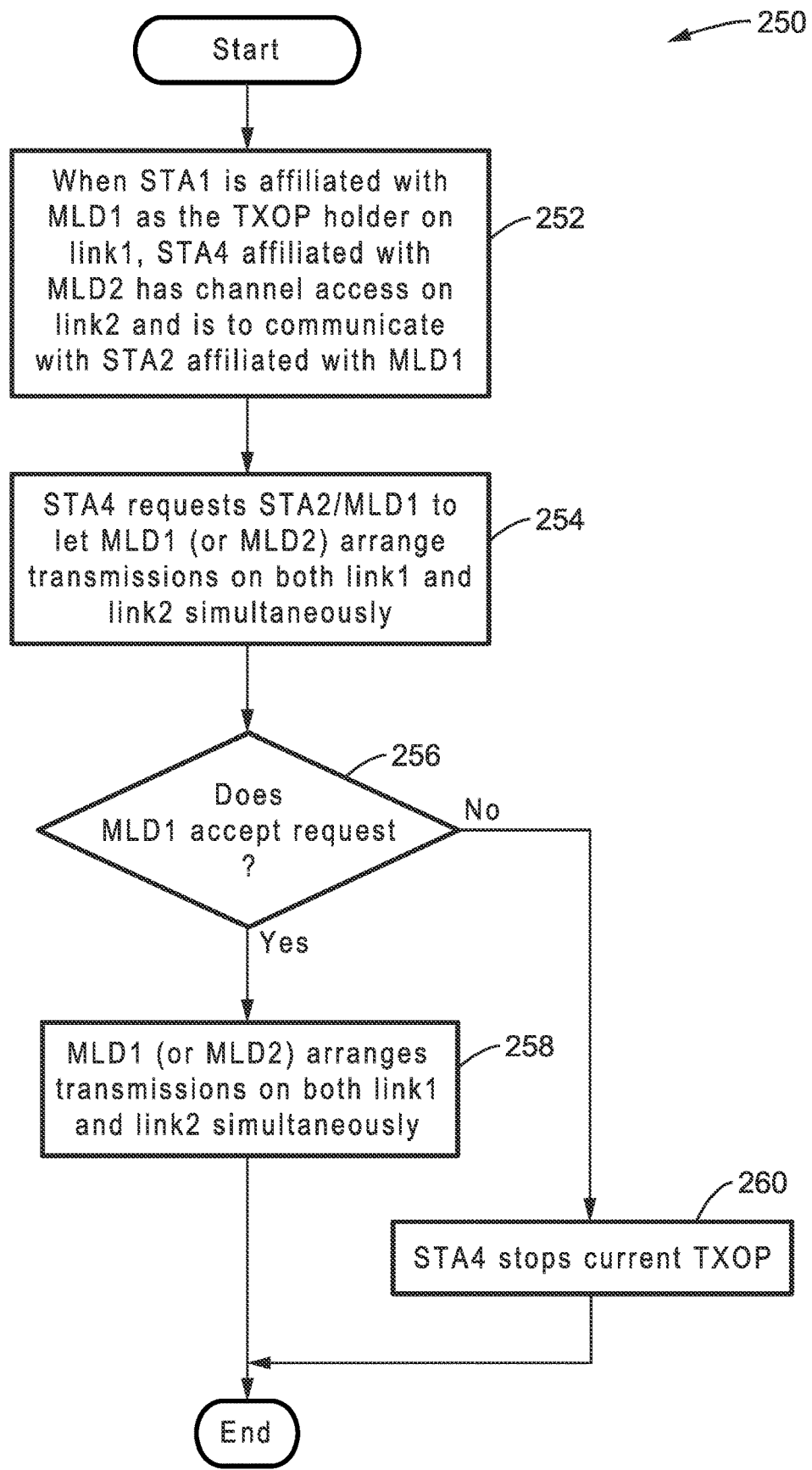
FIG. 24 is a flow diagram of STA4 requesting NSTR coordination so that either MLD1 or MLD2 will arrange the transmissions on both Link1 and Link2 at the same time according to at least one embodiment of the present disclosure.

FIG. 24 illustrates an example embodiment 250 of STA4 requesting NSTR coordination so that either MLD1 or MLD2 arranges the transmissions on both Link1 and Link2 at the same time. It should be appreciated that the MLD and STA numbers are used only for differentiating between MLDs and STAs, and not for limiting the flow diagrams to any specifically numbered MLD or STA.

When STA1, affiliated with MLD1, is the TXOP holder on Link1 252, then STA4 affiliated with MLD2 has channel access on Link2 and is to communicate with STA2 affiliated with MLD1.

Then in block 254 STA4 requests STA2 or MLD1 to let MLD1 (or MLD2) to arrange transmissions on both Link1 and Link2 simultaneously. It should be noted that when STA4 accesses the channel on Link2, it may not be able to transmit to STA2 on Link2 if STA1 is transmitting on Link1. By way of example and not limitation, STA4 can use the method described in Section 4.3 to occupy the channel and send packets to STA2 at the proper time.

Check 256 determines if the MLD (MLD1) has accepted the request. If the condition is met, then MLD1 (or MLD2, respectively) arranges 258 the transmissions on both Link1 and Link2 simultaneously on both links to eliminate the chance of in-device coexistence (IDC) interference arising. It should be noted that in some cases MLD1 (or MLD2, respectively) can stop arranging transmissions when one of the TXOPs on the two links ends.

Otherwise, if check 256 is not met because the request was not accepted, then at block 260 STA4 stops the current TXOP.

Figure 25:
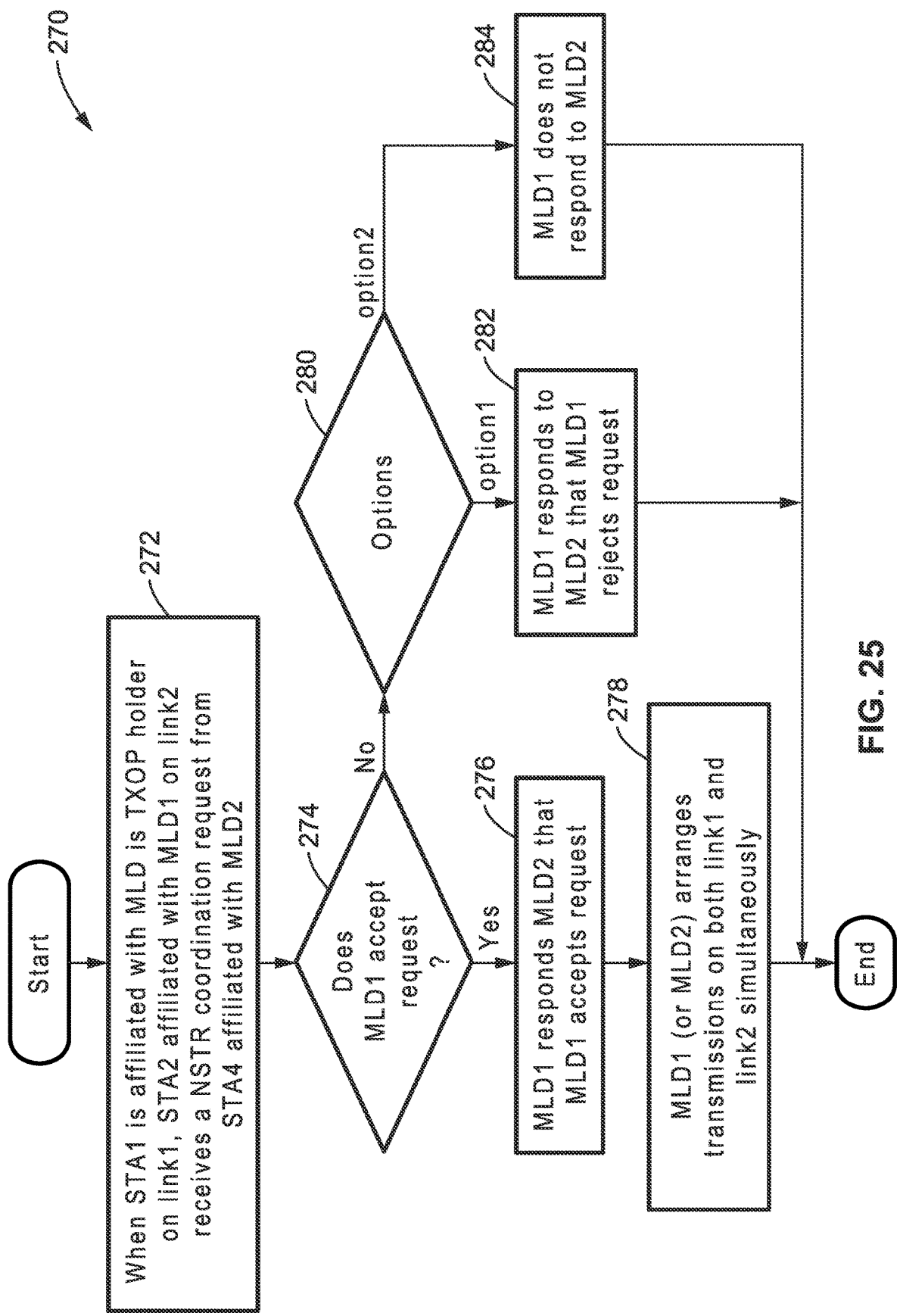
FIG. 25 is a flow diagram of STA2, or MLD1, responding to a NSTR coordination request according to at least one embodiment of the present disclosure.

FIG. 25 illustrates an example embodiment 270 of STA2 or MLD1 responding to a NSTR coordination request. When STA1 is the TXOP holder on Link1, STA2 receives 272 a NSTR coordination request from STA4 on Link2 to allow MLD1 (or MLD2) to arrange transmissions on both links simultaneously.

Check 272 determines if the request was accepted. If the request was accepted, then at block 276 MLD1 responds to MLD2 that it accepts the request. Then MLD1 (or MLD2, respectively) start to arrange 278 transmissions on both links simultaneously.

Otherwise, if it is determined at block 274 that the request was rejected by STA2 or MLD1, then at block 280 an option is determined. If option1 is selected 282, then STA2 or MLD1 responds to MLD2 that it rejects the request. Alternatively, if option2 is selected then STA2 or MLD1 can reject the request 284 without the need to send a response.

4.4.2. Examples of NSTR Request Operation

This section details several examples of STA4 requesting NSTR coordination with MLD1 after it accesses the channel as described in Section 4.3.

Figure 26:
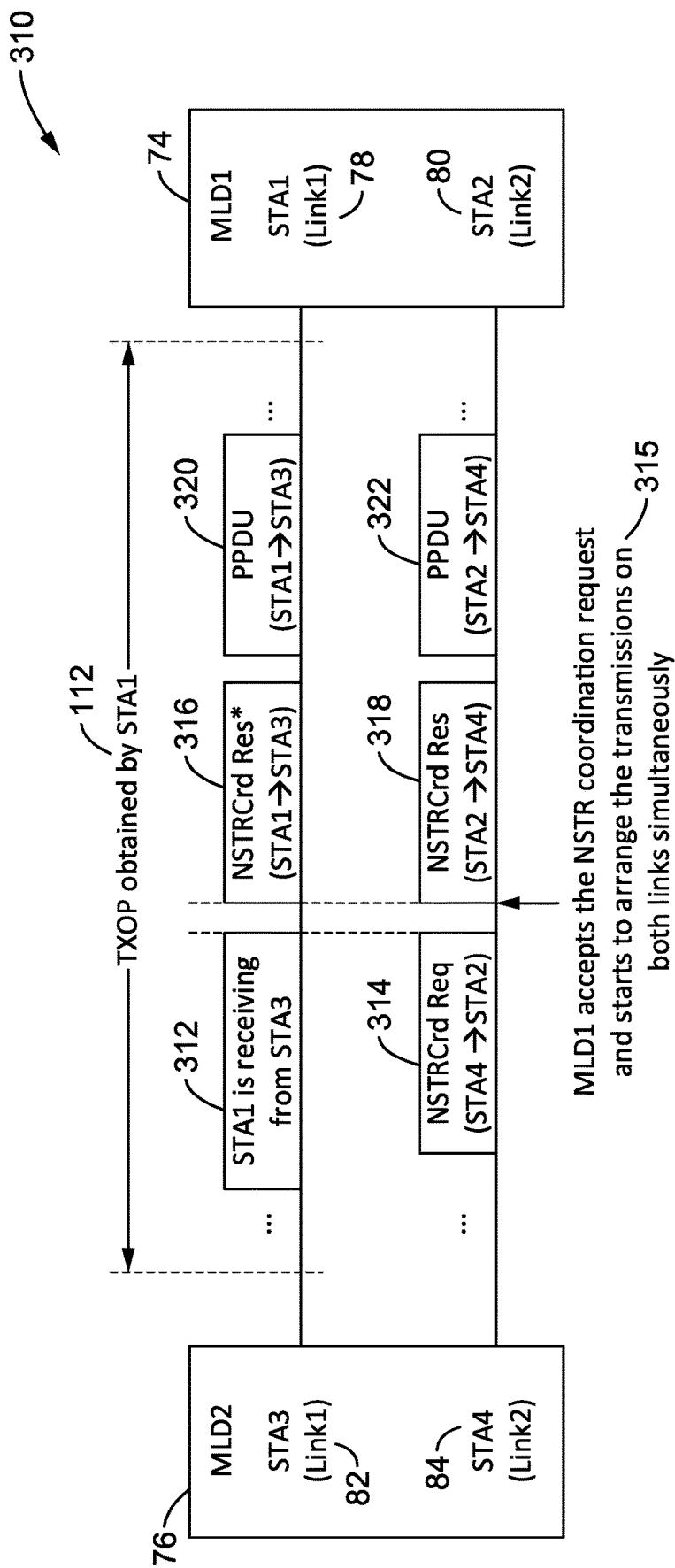
FIG. 26 is a communication diagram of STA4 requesting a NSTR coordination to allow MLD1 to arrange transmission on NSTR links according to at least one embodiment of the present disclosure.

FIG. 26 illustrates an example embodiment 310 of STA4 requesting a NSTR coordination to allow MLD1 to arrange transmissions on the NSTR links. The figure depicts MLD2 76 with its associated STA3 82 and STA4 84, which communicate with MLD1 74 having associated STA1 78 and STA2 80.

STA1 obtains the TXOP 112 on Link1 and starts receiving 312 on Link1 from STA3. STA4 first sends a NSTR coordination request frame (NSTRCrd Req as shown in the figure) 314 over Link2 to STA2 to request that MLD1 arrange the transmissions on both Link1 and Link2. In the NSTR coordination request frame, STA4 can also indicate the NSTR coordination time during which MLD1 will arrange the transmissions on both links. The buffer status of STA4 or MLD2 could also be carried by the NSTR coordination request frame. As shown in the figure, despite STA1 being the TXOP holder on Link1, STA2 can receive the NSTR coordination request frame when STA1 is receiving at the same time.

Then, MLD1 accepts the NSTR coordination request 315, and sends a NSTR coordination response frame (NSTRCrd Res as shown in the FIG. 316, 318 back to MLD2, and associated STA3 and STA4, to accept the sharing request. It should be noted that sending of the NSTR coordination response frame on Link1 may not be necessary and this frame can be replaced by any other PPDUs transmitted by STA1. Meanwhile, MLD1 is arranging transmissions on both links simultaneously. For example, MLD1 can control the transmitting on both links simultaneously, or receiving on both links simultaneously.

It should be noted that the format of the NSTR coordination request frame and NSTR coordination response frame can be similar to that in FIG. 32. It at least one embodiment/mode/case, the NSTR coordination request frame may include a Ready-to-Forward (RTF) frame as shown in FIG. 33, or a BSR frame as defined in IEEE 802.11ax, and the NSTR coordination response frame is a trigger frame as defined in IEEE 802.11ax.

When MLD1 takes over the TXOPs on both links, PPDU transmission direction on the two links should be the same since the two links belong to the same NSTR link pair. The figure depicts PPDU transmissions 320 and 322 being performed in the TXOP.

It should be noted that the NSTRCrd Res (STA1 to STA3) on Link1 shown in the figure may be replaced by any other PPDUs since the NSTRCrd Res (STA2 to STA4) on Link2 can provide results of the NSTR coordination request. That is, it is unnecessary for NSTRCrd Res (STA1 to STA3) on Link1 to be transmitted.

Figure 27:
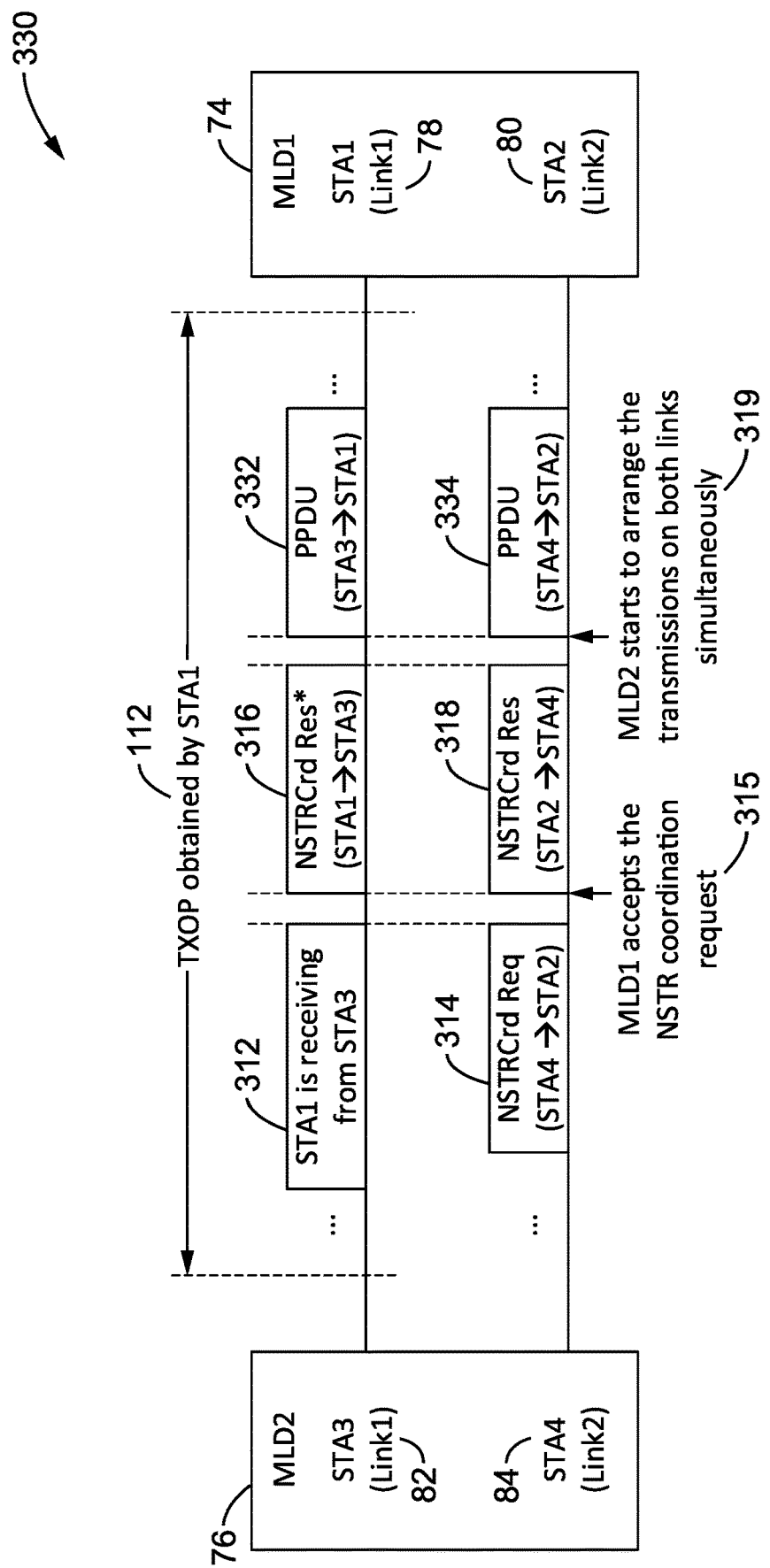
FIG. 27 is a communication diagram of STA4 requesting NSTR coordination to allow MLD2 to arrange the transmissions on NSTR links according to at least one embodiment of the present disclosure.

FIG. 27 illustrates an example embodiment 330 of STA4 requesting NSTR coordination to allow MLD2 to arrange the transmissions on NSTR links. The MLDs, STAs and links are the same as seen in FIG. 26.

STA1 obtains the TXOP 112 on Link1 and starts receiving 312 on Link1 from STA3. STA4 sends a NSTR coordination request frame (NSTRCrd Req as shown in the figure) 314 to ask for arranging the transmissions on both Link1 and Link2. In the NSTR coordination request frame, STA4 can also indicate the time period for which MLD1 should arrange transmissions on both links. The buffer status of STA4 or MLD2 can also be carried by the NSTR coordination request frame. As shown in the figure, although STA1 is the TXOP holder on Link1, STA2 can receive the sharing request frame when STA1 is receiving.

Then, MLD1 accepts 315 the NSTR coordination request and sends NSTR coordination response frame (NSTRCrd Res as shown in the figure) 316 and 318 back to MLD2 to accept the NSTR coordination request. It should be noted that the sending of NSTR coordination response frame on Link1 may not be necessary and this frame can be replaced by any other PPDUs transmitted by STA1. Then, MLD2 starts to arrange 319 the transmissions on both links. When MLD2 takes over the TXOPs on both links, PPDU transmission direction on the two links should be the same since the two links belong to the same NSTR link pair. The figure shows PPDU transmission 332 from STA3 to STA1 and a simultaneous PPDU transmission 334 from STA4 to STA2.

It should be noted that the format of the NSTR coordination request frame and NSTR coordination response frame can be similar to that shown in FIG. 32. In at least one embodiment/mode/case the NSTR coordination request frame comprises a Ready-to-Forward (RTF) frame as shown in FIG. 33, or a BSR frame as defined in IEEE 802.11ax, and/or the NSTR coordination response frame is a MU-RTS TXS trigger frame as defined in IEEE 802.11be.

Figure 28:
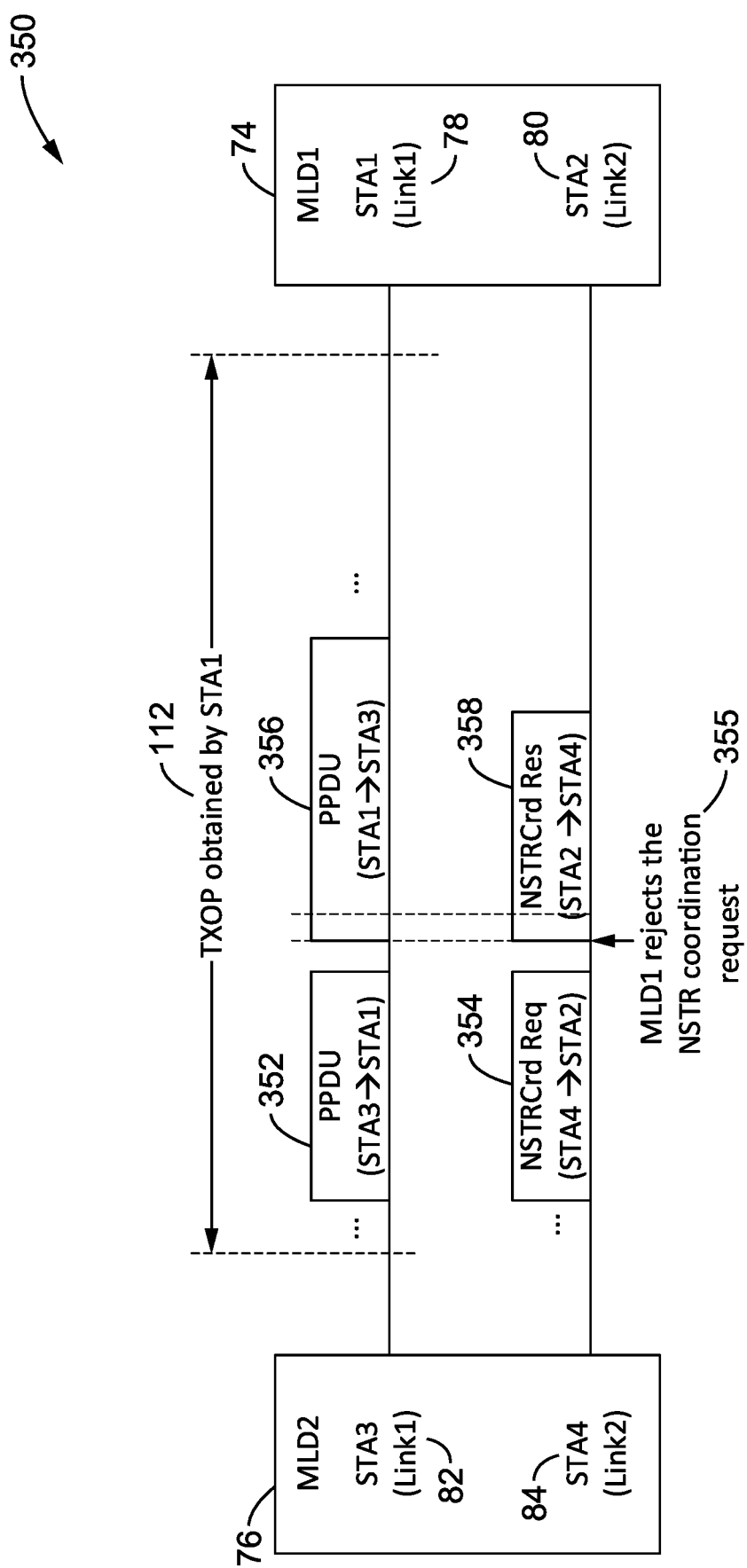
FIG. 28 is a communication diagram of MLD1 rejecting the NSTR coordination request according to at least one embodiment of the present disclosure.

FIG. 28 illustrates an example embodiment 350 of MLD1 rejecting the NSTR coordination request. The MLDs, STAs and links are the same as seen in FIG. 27.

STA1 obtains TXOP 112 on Link1 and starts receiving 352 on Link1 from STA3. STA4 on Link2 is at this time sending a NSTR coordination request frame (NSTRCrd Req as shown in the figure) 354 to request for either MLD1 or MLD2 to arrange the transmissions on both Link1 and Link2. In the NSTR coordination request frame, STA4 can also indicate the time over which the MLD should arrange the transmissions on both links. The buffer status of STA4 or MLD2 can also be carried by the NSTR coordination request frame. As shown in the figure, although STA1 is the TXOP holder on Link1, STA2 can receive the sharing request frame when STA1 is receiving.

MLD1 rejects 355 the NSTR coordination request and STA2 sends a NSTR coordination response frame (NSTRCrd Res as shown in the figure) 358 back to STA4 to reject the NSTR coordination request. Meanwhile, STA1 can continue its transmissions 356 on Link1. Then, MLD2 may end the TXOP on Link2 and re-contend for the channel.

It should be noted that the format of the NSTR coordination request frame can be similar to that shown in FIG. 32.

Figure 29:
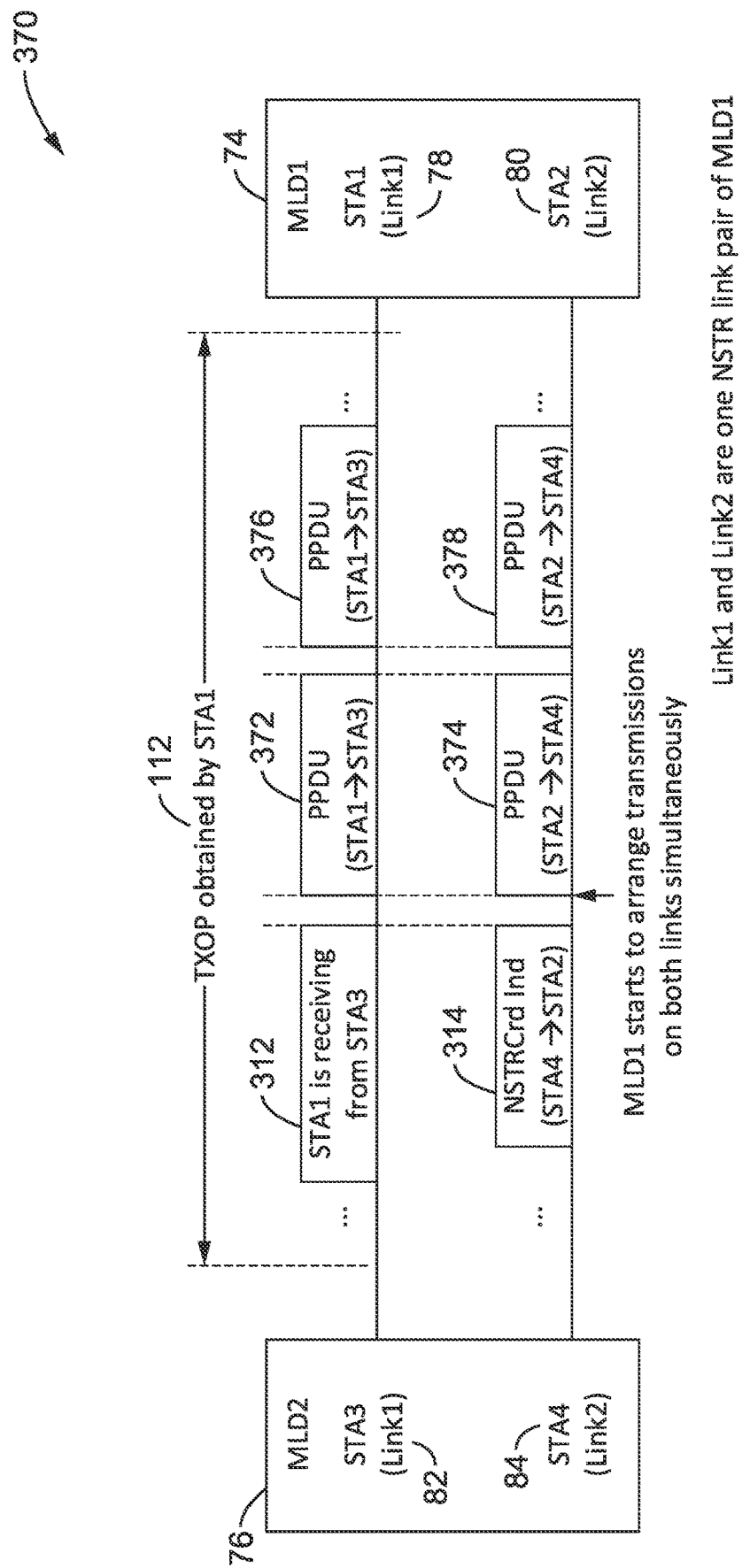
FIG. 29 is a communication diagram of STA4 indicating (requesting) that MLD1 arrange transmissions on the NSTR links according to at least one embodiment of the present disclosure.

FIG. 29 illustrates an example embodiment 370 of STA4 indicating (requesting) to allow MLD1 to arrange transmissions on the NSTR links. The MLDs, STAs and links are the same seen in FIG. 28.

STA1 obtains TXOP 112 on Link1 and starts receiving 312 on Link1 from STA3. STA4 on Link2 is at this time sending a NSTR coordination indication frame (NSTRCrd Ind as shown in the figure) 314 to STA2 and indicates (requests) that MLD1 should arrange the transmissions on both Link1 and Link2. In the NSTR coordination indication frame, STA4 can also choose to indicate the time over which MLD1 should arrange the transmissions on both links. The buffer status of STA4 or MLD2 can also be carried by the NSTR coordination indication frame. As shown in the figure, although STA1 is the TXOP holder on Link1, STA2 can receive the NSTR coordination indication frame when STA1 is receiving at the same time.

Then, MLD1 accepts the request and starts to arrange the PPDU transmissions on both links. As shown in the figure, STA1 can commence transmitting PPDUs 372 and 376 to STA3 on Link1, and STA2 can commence transmitting PPDUs 374 and 378 to STA4 on Link2. When MLD1 arranges transmissions on the two links, it should arrange it so that the transmission directions on the two links are the same. During the transmission on each link, the PPDUs might be aligned or not.

It should be noted that the format of NSTR indication frame can be similar to that shown in FIG. 32 or a MU-RTS TXS trigger frame as defined in IEEE 802.11be.

It should also be noted that the first PPDU (STA2 to STA4) on Link2 can carry an Acknowledgement frame to indicate that the NSTRCrd Ind frame has been received successfully.

Figure 30:
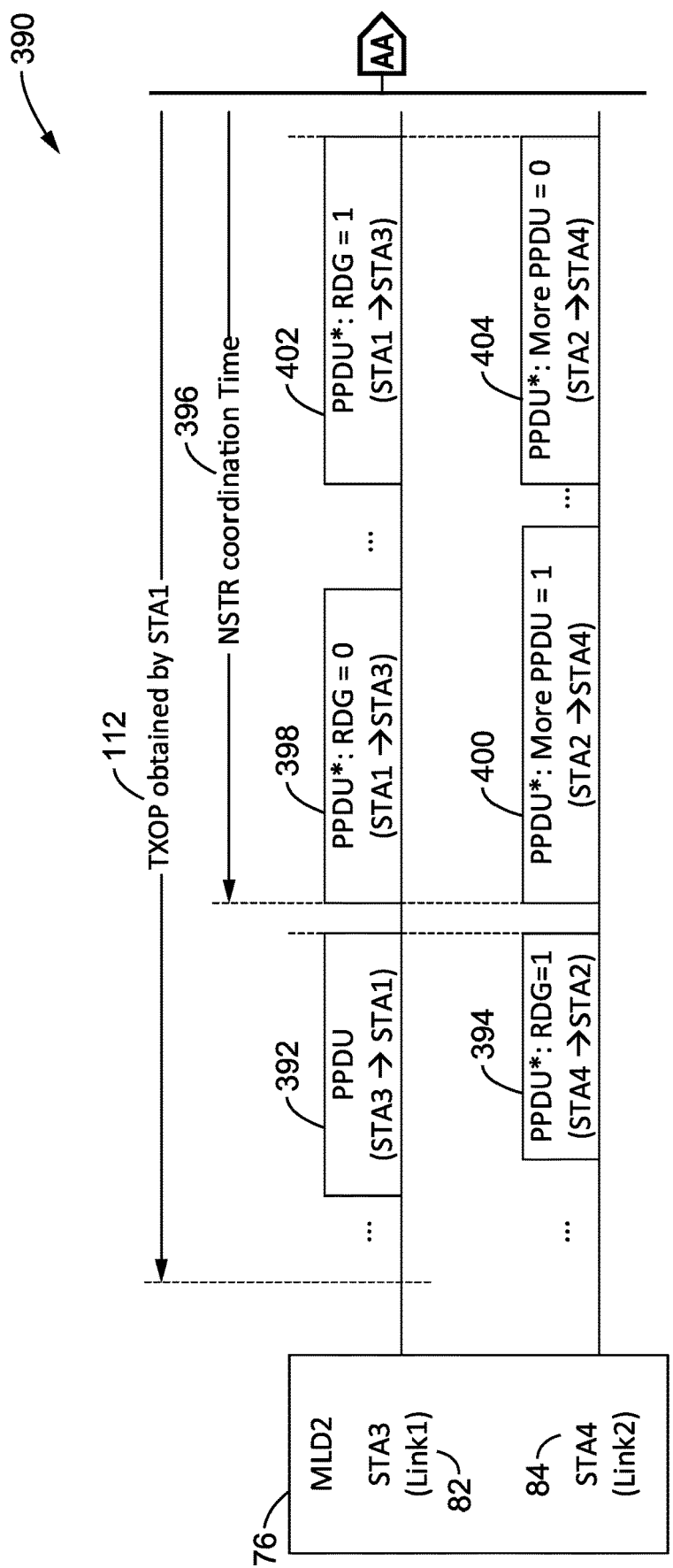
FIG. 30 and FIG. 31 is a communication diagram of reusing a Reverse Direction Grant (RDG) for NSTR coordination according to at least one embodiment of the present disclosure.
Figure 31:
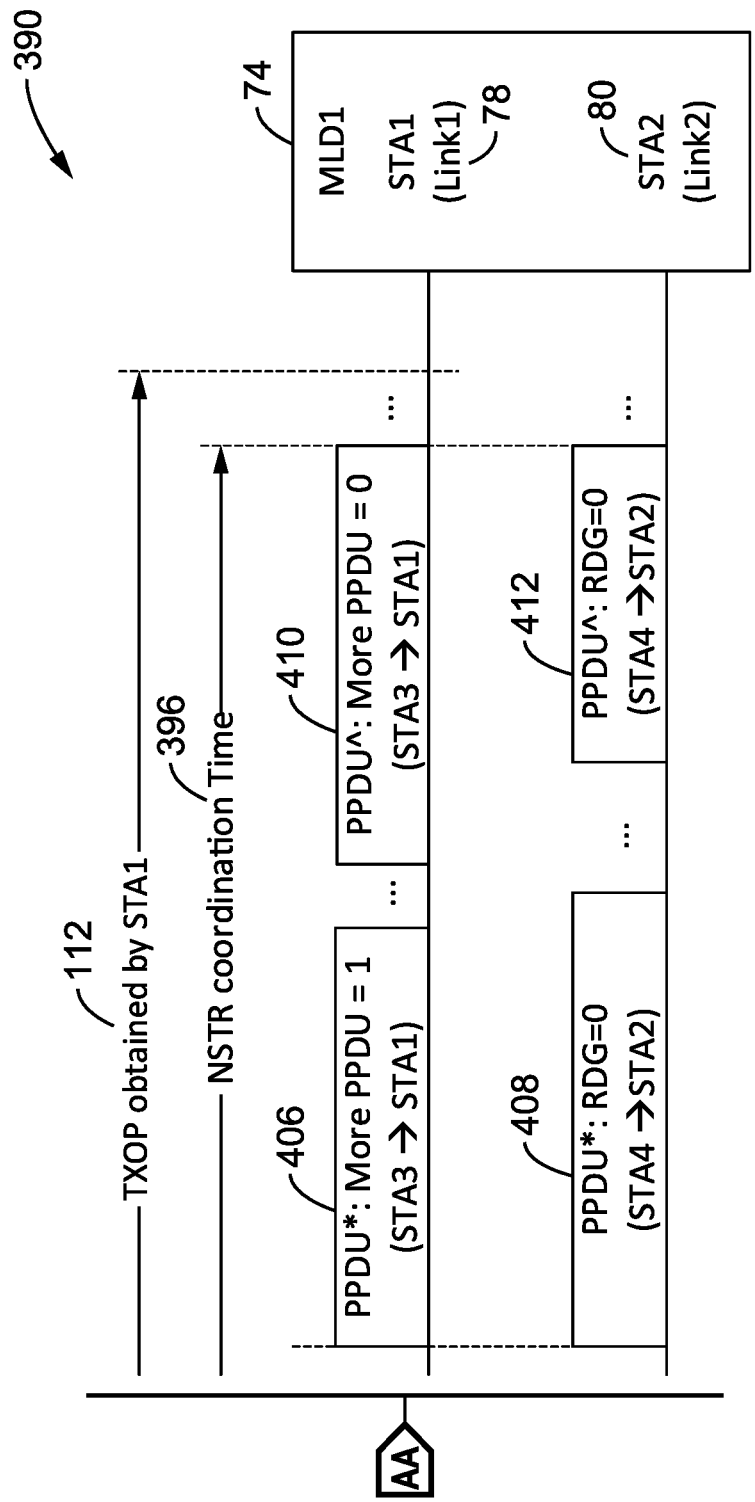

FIG. 30 and FIG. 31 illustrate an example embodiment 390 of reusing a Reverse Direction Grant (RDG) for NSTR coordination. The PPDUs in the figure can carry an extended CAS Control subfield as shown in FIG. 34 in its HT control field.

The MLDs, STAs and links are the same seen in FIG. 29. STA1 obtains TXOP 112 on Link1 and starts receiving 392 on Link1 from STA3.

STA4 sends a PPDU 394 with RDG set to active (e.g., "1") and NSTR coordination indication is set to active (e.g., "1") on Link2 to indicate that MLD1 can arrange transmissions on both Link1 and Link2.

Then, MLD1 arranges the transmissions on both Link1 and Link2 with PPDUs 398, 400, 402, 404, 406, 408, 410 and 412. The RDG/More PPDUs field in the PPDUs transmitted by MLD1 are set to active (e.g., "1") to indicate the ongoing NSTR coordination. A NSTR coordination time period 396 is shown bounding the PPDU transmissions.

The RDG/More PPDU field in the PPDUs are set to ensure the directions of PPDU transmissions on both links are the same. For example, when RDG is inactive (e.g., "0") on Link1 and More PPDU is active (e.g., "1") on Link2 at the same time, the next PPDUs on Link1 and Link2 will be transmitted by MLD1. When the RDG is set active on Link1 and More PPDU is inactive on Link2, at the same time, then the next PPDUs on Link1 and Link2 will be transmitted by MLD2. When More PPDU is active (e.g., "1") on Link1 and RDG is inactive (e.g., "0") on Link2 at the same time, the next PPDUs on Link1 and Link2 will be transmitted by MLD2. When More PPDU is inactive (e.g., "0") on Link1 and RDG is active (e.g., "1") on Link2 at the same time, the next PPDUs on Link1 and Link2 will be transmitted by MLD1.

It should be noted that the RDG and More PPDU subfields share the same bits in the PPDU. When the STA is the TXOP holder, it is the RDG field in the PPDU that it transmits. When the STA is the TXOP responder, it is the More data field in the PPDU that it transmits. When NSTR coordination indication is inactive in the PPDUs, the NSTR coordination ends.

4.4.3. NSTR Coordination Formats

FIG. 32 illustrates an example embodiment 430 of the NSTR coordination request, response and indication frame, having the following fields. Thus, it should be appreciated that this frame is utilized in at least one embodiment for NSTR coordination requests, NSTR coordination responses and for NSTR coordination indications.

A Frame Control field indicates the type of frame. This can indicate whether this frame is a NSTR coordination request frame or NSTR coordination response frame or NSTR coordination indication frame. It at least one embodiment/mode/case this field only indicates the frame carries the NSTR coordination information, while it does not indicate if it is a NSTR coordination request, response, or indication frame. A Duration field contains NAV information used for CSMA/CA channel access. A RA field contains an address for the recipient of the frame. A TA field contains the address of the STA that transmitted the frame.

A NSTRCrd frame type field is set to indicate the type of NSTR coordination frame. When this field is set to "request", then the frame is an NSTR coordination request frame. In response to this request, the receiver decides whether it accepts the request based on the NSTR coordination information as indicated in the frame. The receiver of this frame may also respond with a NSTR coordination response frame to indicate its decision. When this field is set to "response", then the frame is a NSTR coordination response frame. Upon receiving this frame, the result (decision) on its NSTR coordination request is determined. If the request is accepted, then both the transmitter and receiver of this frame will follow the NSTR coordination information as indicated in the frame. If the request is rejected, the receiver of this frame may end the current TXOP and re-contend for the channel. When this field is set to "indication", this frame is an NSTR coordination indication frame. The receiver of this frame thus determines that it can take over the TXOP resources as indicated in the NSTR coordination indication frame and act as TXOP holder.

An NSTRCrd information field is set to indicate the NSTR coordination information. When a STA or MLD receives this information, it can use the information in this field for performing NSTR coordination. An NSTRCrd indication field is an NSTR coordination indication which is set to indicate the NSTR coordination status. This field can be implemented as a one bit indication.

When this field is set to active (e.g., "1") in the NSTR coordination request frame, it indicates the transmitter requests NSTR coordination. Otherwise, it is set to inactive (e.g., "0"). When the receiver receives this field in the NSTR coordination request frame, it can recognize that the transmitter is requesting NSTR coordination and decides to accept or reject the request and indicate its decision in the NSTR coordination response frame.

When this NSTR coordination field is set to active (e.g., "1") in a NSTR coordination response frame, it indicates the transmitter of the NSTR coordination response frame accepts the NSTR coordination request from the receiver of the NSTR coordination response frame. Otherwise, it is set to inactive (e.g., "0") and indicates that the transmitter rejects the NSTR coordination request. The transmitter and receiver of this frame will start the NSTR coordination if this field is set to active (e.g., "1"). Otherwise, the receiver recognizes that the NSTR coordination request has been rejected, and it may terminate the current TXOP and re-contend for the channel.

When this NSTR coordination field is set to active (e.g., "1") in the NSTR coordination indication frame, it indicates the transmitter of the NSTR coordination indication frame is allowing the receiver of the NSTR coordination indication frame to arrange the transmissions during the NSTR coordination time. The receiver can then take over the TXOP and act as the TXOP holder during the NSTR coordination time. Otherwise, this field is set to inactive (e.g., "0").

An NSTR coordinator field is set to indicate which MLD should arrange the transmission or act as TXOP holder during the NSTR coordination time period over the links.

When this field is set to the transmitter MLD of a NSTR coordination request frame, it represents that the transmitter MLD should act as the TXOP holder on both links of a NSTR link pair during the NSTR coordination time.

When this field is set to the receiver MLD of a NSTR coordination request frame or a NSTR coordination indication frame, this indicates that the receiver MLD should act as the TXOP holder and arrange the transmissions during the NSTR coordination time on both links of a NSTR link pair.

An NSTRCrd time field is set to indicate the NSTR coordination time over the links. This field indicates that the NSTR coordinator can arrange the transmissions or act as the TXOP holder during the following NSTR coordination time.

An AC constraint field is set to indicate the ACs from which the traffic can be transmitted during the NSTR coordination time. It should be noted that this field may only take effect on the link over which this field is being transmitted. If this field takes effect on both links, the transmissions on both links should follow the AC constraint indicated in this field.

This AC constraint field can be set to a single AC. Then in at least one embodiment/mode/case, only the traffic from that AC can be transmitted during the NSTR coordination time. In certain instances, this field can represent the primary AC during the NSTR coordination time. The transmitter and the receiver of this field should follow the transmission rule, such as TXOP sharing rule in IEEE 802.11ax to transmit during the NSTR coordination time. In at least one embodiment/mode/case, the traffic from an AC whose priority is higher or equal to the AC indicated in this field can be transmitted during the NSTR coordination time.

This AC constraint field can also comprise an AC bitmap whereby each bit represents an AC. When a bit in this field is set to active (e.g., "1"), then the traffic from the AC corresponding to that bit is transmitted during the NSTR coordination time. Otherwise, this bit is set to inactive (e.g., "0"), so that the traffic from the AC corresponding to that bit is not to be transmitted during the NSTR coordination time.

This AC constraint field can also be composed of a one bit indication. When this bit is set to active (e.g., "1"), then only the traffic from the primary AC can be transmitted during the NSTR coordination time. Otherwise, if this bit is set to inactive (e.g., "0"), then the traffic from any ACs can be transmitted during the NSTR coordination time. TXOP sharing as defined in IEEE 802.11ax may be allowed.

An NSTR link ID field is set to indicate to the other link of the NSTR link pair, that the NSTR coordinator is to arrange the transmissions and act as the TXOP holder during NSTR coordination.

A Min MPDU size field is set in the NSTR coordination request or indication frame to indicate the minimum MPDU size that the STA which sets this field requests to be transmitted during the NSTR coordination time. When the NSTR coordination process commences, any MDPUs sent by the STA which sets this field should be larger than the minimum MPDU size. This field can be set in a number of ways, the following provided by way of example and not limitation. This field can be set in the NSTR coordination response frame by duplicating the value from the corresponding NSTR coordination request frame if the NSTR coordination request is accepted. This field could also be set in the NSTR coordination response frame to indicate the minimum size of MPDUs that the STA which sets this field will transmit during the NSTR coordination time. It should be noted that this field could also contain a minimum MSDU size to indicate the minimum MSDU or A-MSDU size that the STA which sets this field will transmit during the NSTR coordination time.

A Transmitting time field is set in the NSTR coordination request, or indication frame, to indicate the minimum time period, that the STA which sets this field, has requested in which to transmit PPDUs to the receiver of this field during the NSTR coordination time. When NSTR coordination commences, the STA which sets this field should be allocated at least this amount of time for its transmissions. This field can be set in a number of ways, the following provided by way of example and not limitation. This field can be set in the NSTR coordination response frame by duplicating the value from the corresponding NSTR coordination request frame if the NSTR coordination request is accepted. This field could also be set in NSTR coordination response frame to indicate the minimum time that the STA which sets this field requires for performing its transmissions during the NSTR coordination time.

A Buffer Status Report field is set by a transmitter STA to indicate its buffer status. When a NSTR coordinator receives this field, it should arrange the transmissions during the NSTR coordination time based on the received buffer status of the transmitter. In at least one embodiment, this field can be formatted as defined in IEEE 802.11ax.

FIG. 33 illustrates an example embodiment 450 of the RTF frame. A Frame Control field indicates the type of frame. A Duration field contains NAV information used for CSMA/CA channel access. An RA field contains an address for the recipient of the frame. A TA field contains the address of the STA that transmitted the frame. A BSR control field is set by the transmitter to indicate its buffer status. When a STA receives this field, it can arrange the transmissions based on the received buffer status of the transmitter. The format of this field can be implemented to be the same as defined in IEEE 802.11ax. A Trigger type field is set to indicate the trigger type that the transmitter requests the receiver to transmit after receiving this frame. A Common Information (Info) field is the same as the Common Info field of the trigger frame as indicated in the trigger type. The receiver should duplicate the common info in the solicited trigger frame it transmits. A User Information (Info) field is the same as the User Info field of the trigger frame as indicated in the trigger type. The receiver should duplicate the Common Info in the solicited trigger frame it transmits.

FIG. 34 illustrates an example embodiment 470 of extended CAS control subfield variants of an A-control subfield.

An AC constraint field can be represented in different ways, including using a one bit indication. By way of example and not limitation, a single bit indicator (flag) implementation follows. When this bit is set to a first state (e.g., "1"), only traffic from the primary AC can be transmitted during the NSTR coordination time. Otherwise, if this bit is set to a second state (e.g., "0") then traffic from any ACs can be transmitted during the NSTR coordination time. TXOP sharing as defined in IEEE 802.11ax may be allowed.

RDG/More PPDU field is a multipurpose field. This field is a Reverse Direction Grant (RDG) field when the transmitter of this field is the TXOP holder. If this bit is set to active (e.g., "1"), then the next PPDU should be transmitted by the receiver. If this bit is set to inactive (e.g., "0"), then the next PPDU is still transmitted by the transmitter.

This field is a More PPDU field when the transmitter of this field is the TXOP responder. If this bit is set to active (e.g., "1"), then the next PPDU should be transmitted by the transmitter. If this bit is set to inactive (e.g., "0"), then the next PPDU should be transmitted by the receiver.

PSRT PPDU subfields can be the same as defined in IEEE 802.11ax.

A NSTRCrd indication field is an NSTR coordination indication which is set to indicate the NSTR coordination status. This field can be implemented in a number of ways, including using a one bit indication (flag). Setting this field to a first state (e.g., "1") in the NSTR coordination indication frame, indicates NSTR coordination is ongoing. The MLD which transmits the next PPDUs should ensure the direction of the PPDUs on the links are the same. Otherwise, this field is set to a second state (e.g., "0").

A NSTRCrd time field is set to indicate the NSTR coordination time over the links. This field indicates that the NSTR coordinator is allowed to arrange the transmissions or act as the TXOP holder during the following NSTR coordination time.

The fields ACI, Scaling Factor and Queue Size are the fields which represents the buffer status of the transmitter. The receiver can use this information for arranging the transmissions. The ACI field indicates the access category of the buffer reported by the transmitter. A Scaling Factor field indicates the unit of the Queue Size. The encoding of this field can be the same as in IEEE 802.11ax. A Queue Size field indicates the amount of buffered traffic, in units of Scaling Factor, of the transmitter.

4.5. Examples for Another Network Topology

The previous examples in Section 4.4.2 show the NSTR coordination between MLD1 and MLD2 when STA1 affiliated with MLD1 is the TXOP holder on Link1 and communicating with STA3 affiliated with MLD2. However, it is also possible that when STA4 gains the channel access on Link1 to launch a NSTR coordination, STA1 is the TXOP holder but is not communicating with STA3. In this section, such a scenario is discussed.

Figure 35:
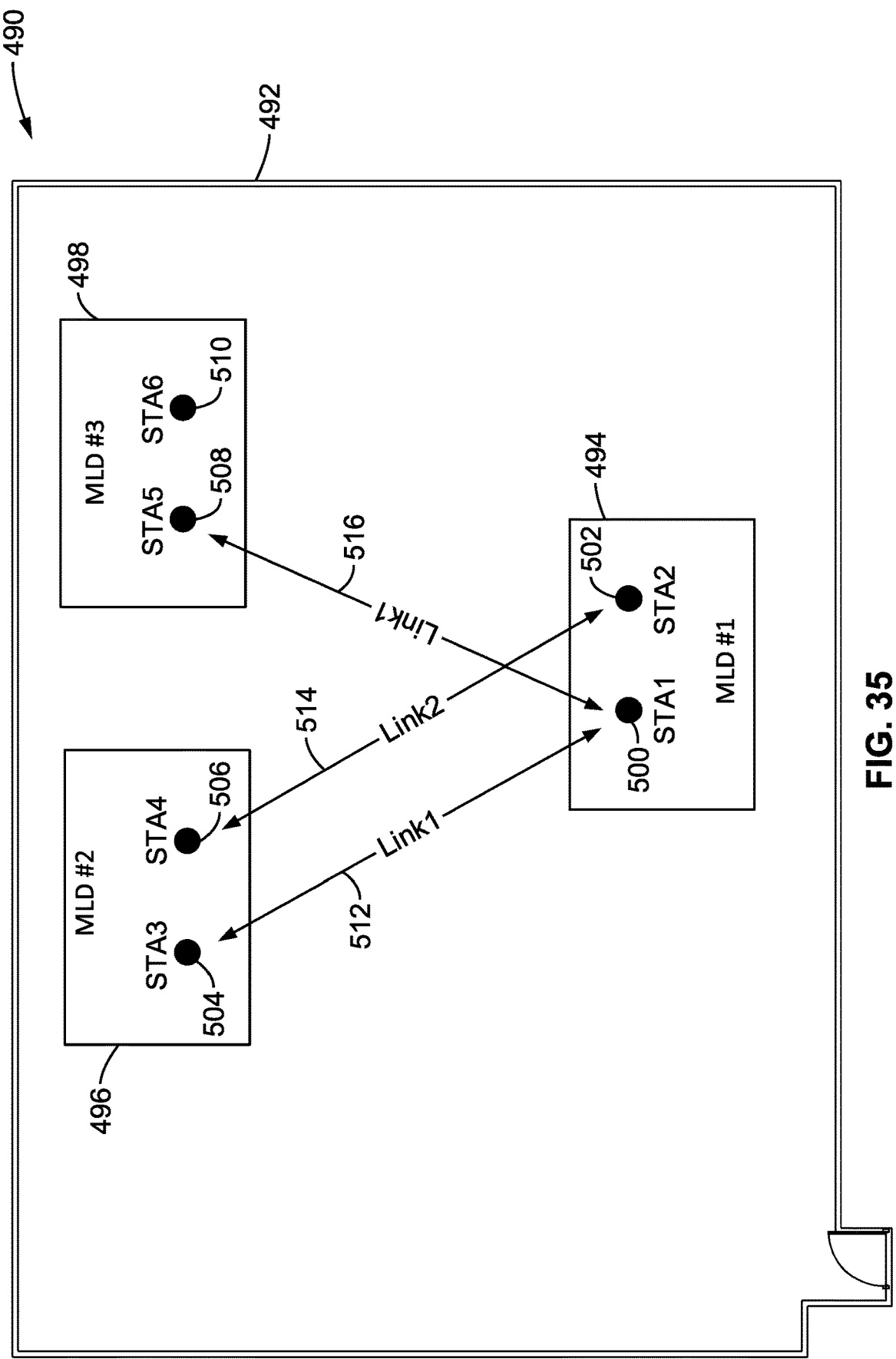
FIG. 35 is a network topology of MLD connections as discussed in this section according to at least one embodiment of the present disclosure.

FIG. 35 illustrates an example embodiment 490 of a network topology as discussed in this section. Compared with FIG. 15, the network topology shown in FIG. 35 adds another station, STA5, which is able to communicate with STA1 on Link1. STA5 could be a STA affiliated with a MLD, e.g., MLD3 as shown in the figure, or a STA that is not affiliated with a MLD.

It should be appreciated that embodiment 490 is an example network topology utilized for explaining operations in this section. It should be appreciated that this topology, like FIG. 15, is depicted by way of example and not by way of limitation, as the apparatus and method of the present disclosure is not limited to any specific topologies. In addition, the specific MLD, STA and Link references throughout the present disclosure are provided only to simplify the understanding of the operations being discussed.

As shown in the example figure it is assumed STAs are on three MLDs 494, 496 and 498 as found within a structure 492, such as a meeting room. STA1 500 and STA2 502 are affiliated with MLD1 494, STA3 504 and STA4 506 are affiliated with MLD2 496, and STA5 508 and STA6 510 are affiliated with MLD3 498. STA1 and STA2 are associated (communicate) with STA3 and STA4 over Link1 512 and Link2 514, respectively. It will be noted that Link1 and Link2 are one NSTR link pair of MLD1. STA1 and STA5 communicate over Link1 516 which is a Peer-To-Peer (P2P) communication.

In the figure this case considers it possible that MLD2 is a STR AP while MLD1 and MLD3 are non-AP MLD associated with MLD2. It should be noted that the association between MLD2 and MLD3 is not shown in the figure, but it can be achieved through an AP STA affiliated with MLD2 association with a non-AP STA affiliated with MLD3 over Link 1 or Link2 or any other link.

All STAs use CSMA/CA for random channel access on all the links. It is also assumed in the network topology of FIG. 35 that MLD2 can determine the transmitting and receiving status of STA1 on Link1 since STA3 affiliated with MLD2 is monitoring the transmission between STA1 and STA5 on Link1, such as in response to checking TA, RA fields of the TDLS frames. Then, MLD2 can share the status information of STA1 on Link1 with its affiliated STA4 on Link2.

The examples shown in Section 4.3 demonstrated channel access of STA4 when STA1 is communicating with STA3. However, it can also arise that when STA4 accesses the channel, STA1 is communicating with other STAs which is not affiliated with the same MLD as STA4. This section shows that the same channel access methods shown in Section 4.3 also operate in such a scenario.

Figure 36:
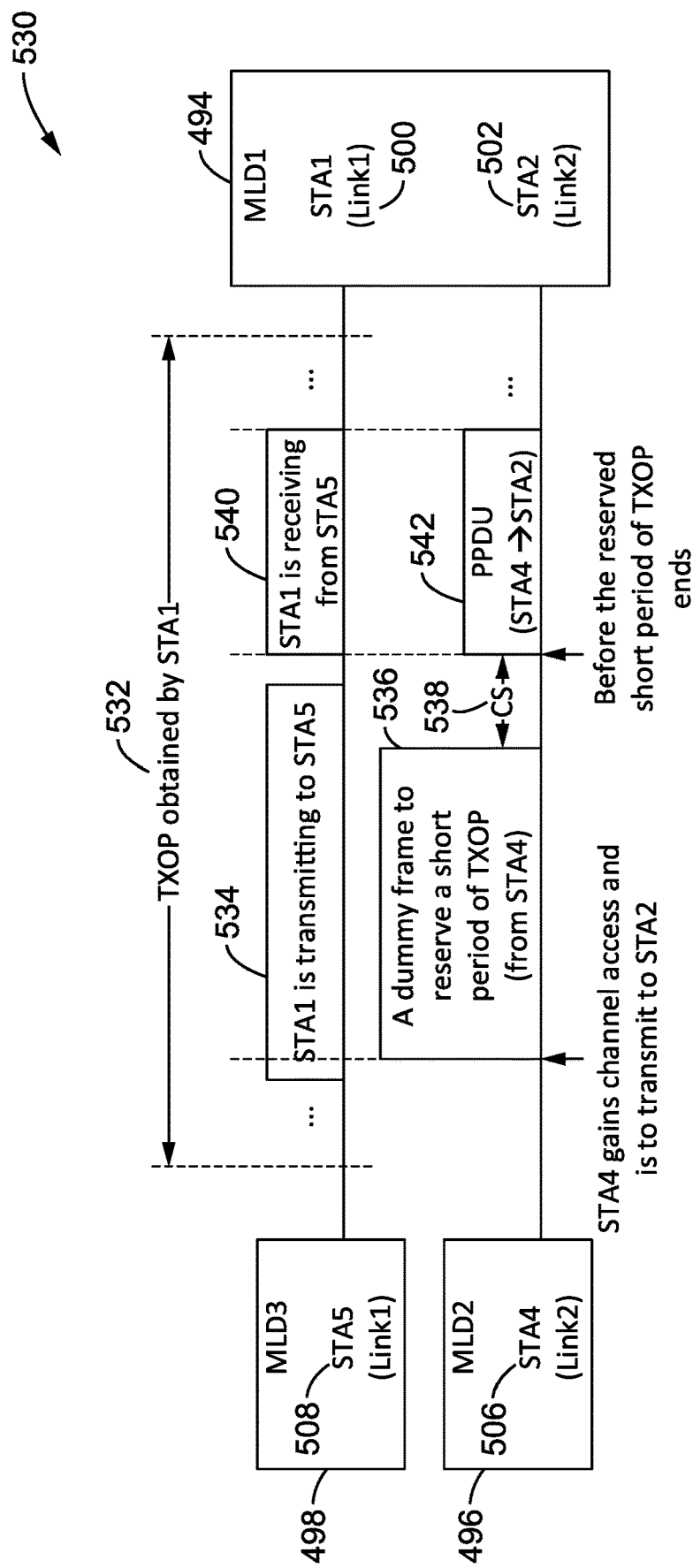
FIG. 36 is a communication diagram of STA4 using a dummy frame to reserve the TXOP on Link2, while STA1 is transmitting to STA5 according to at least one embodiment of the present disclosure.

FIG. 36 illustrates an example embodiment 530 of STA4 using a dummy frame to reserve the TXOP on Link2 which is similar to FIG. 17 except that STA1 is transmitting to STA5. The network topology for this example is shown in FIG. 35.

The TXOP is obtained 532 by STA1, after which it starts transmitting 534 to STA5. When STA4 gains channel access for transmitting to STA2, STA1 is transmitting on Link1. Thus, STA4 transmits a dummy frame 536 to reserve a short period of the TXOP. Before the end of the reserved short period of TXOP, STA1 finishes transmitting and starts receiving 540 on Link1 from STA5. When STA1 commences receiving, STA4 is able to send a PPDU 542 to STA2 that is received by STA2 without any possibility of in-device coexistence interference. It should be noted that PPDU alignment between two links may not be necessary. However, the direction of the PPDU transmission on the two links should be aligned. It should also be noted that the transmission information (preamble and MAC header of PPDUs) on Link1 may aid STA4 in transmitting PPDUs (STA4 to STA2) when STA1 is receiving.

During the time between the dummy frame and the PPDU from STA4 to STA2 on Link2, STA4 may need to perform Carrier Sensing (538 CS) to sense channel status. If the channel becomes busy during that time, STA4 may not be able to transmit PPDU from STA4 to STA2 and start a new channel contention process.

It should be noted that MLD2 is an STR MLD. STA4 could start and end the PPDU transmissions (could be more than one PPDUs) to STA2 within the time during which STA4 is receiving on Link1.

The examples shown in Section 4.4 illustrate NSTR coordination launched by STA4 when STA1 is communicating with STA3. However, in certain instances when STA4 accesses the channel, STA1 may be communicating with other STAs which are not affiliated with the same MLD as STA4. This section demonstrates that the NSTR coordination mechanism also operates in such scenarios.

Figure 37:
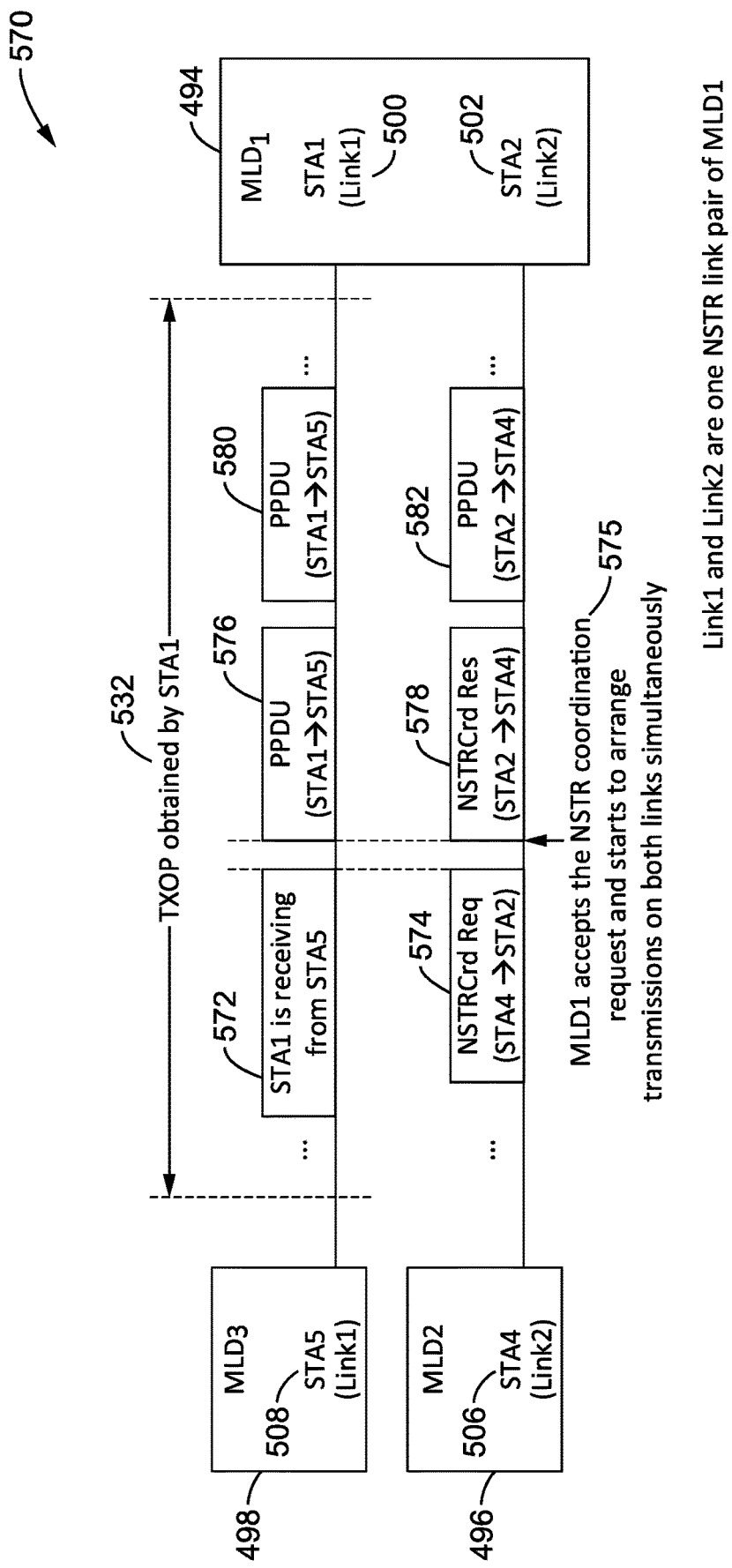
FIG. 37 is a communication diagram of MLD1 accepting a NSTR coordination request and arranging transmissions on NSTR links for different MLDs according to at least one embodiment of the present disclosure.

FIG. 37 illustrates an example embodiment 570 of MLD1 accepting a NSTR coordination request and arranging transmissions on NSTR links for different MLDs. The network topology in this example is shown in FIG. 35.

The TXOP is obtained 532 by STA1, after which it starts receiving 572 from STA5. STA4 first sends a NSTR coordination request frame (NSTRCrd Req as shown in the figure) 574 to STA2 to request MLD1 to arrange the transmissions on both Link1 and Link2. In the NSTR coordination request frame, STA4 can also indicate the time period over which MLD1 should arrange the transmissions on both links. The buffer status of STA4 or MLD2 can also be carried by the NSTR coordination request frame. As shown in the figure, although STA1 is the TXOP holder on Link1 that is communicating with STA5, STA2 can receive the NSTR coordination request frame when STA1 is receiving at the same time.

Then, MLD1 accepts the NSTR coordination 575, and STA2 sends a NSTR coordination response frame (NSTR- Crd Res as shown in the figure) 578 back to STA4 to accept the NSTR coordination request, as STA1 of MLD1 is transmitting PPDU 576 to STA5. MLD1 arranges the transmissions on both links simultaneously. It should be noted that the TXOP responder on Link1 is STA5 which is not affiliated with MLD2. In this case, when MLD1 starts to arrange transmissions on the two links, it continues its transmission, shown as PPDUs 576 and 578 with STA5 on Link1, and also commences transmissions, shown as PPDU 582, with STA4 on Link2. It should be noted that when MLD1 arranges transmissions on the two links, it should make the transmission directions on these two links to be the same. During the transmission on each link, the PPDUs might be aligned or not.

It should be noted that the format of NSTR coordination request frame and NSTR coordination response frame can be similar to that shown in FIG. 32. It at least one embodiment/mode/case, the NSTR coordination request frame is an RTF frame as shown in FIG. 33, or a BSR frame as defined in IEEE 802.11ax, and the NSTR coordination response frame is a trigger frame as defined in IEEE 802.11ax.

5. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit as a station (STA) for performing multi-link operations over multiple links of a channel and using carrier sense multiple access/collision avoidance (CSMA/CA) to access a channel for communicating with other wireless stations (STAs) of a network; (b) a processor coupled to said wireless communication circuit for performing a communication protocol; (c) a non-transitory memory storing instructions executable by the processor for communicating with other STAs on the network; and (d) wherein said instructions, when executed by the processor, perform one or more steps comprising: (d)(i) wherein a first multiple-link device (MLD1) is configured for performing non-simultaneous transmit receive (NSTR) communications, and is the transmit opportunity (TXOP) holder of a first link (Link1); (d)(ii) wherein said STA is operating in a second multiple-link device (MLD2) and accesses the channel on a second link (Link2) for transmitting to MLD1; (d)(iii) wherein MLD2 immediately transmits over Link2 to MLD1, if MLD1 is receiving on Link1; and (d)(iv) wherein MLD2 transmits a frame over Link2 to occupy the channel if MLD1 is transmitting on Link1, then when MLD1 is receiving on Link1 then MLD2 performs transmitting another frame to MLD1.

An apparatus for wireless communication in a network, the apparatus comprising: (a) a wireless communication circuit as a station (STA) for performing multi-link operations over multiple links of a channel and using carrier sense multiple access/collision avoidance (CSMA/CA) to access a channel for communicating with other wireless stations (STAs) of a network; (b) a processor coupled to said wireless communication circuit for performing a communication protocol; (c) a non-transitory memory storing instructions executable by the processor for communicating with other STAs on the network; and (d) wherein said instructions, when executed by the processor, perform one or more steps comprising: (d)(i) wherein said STA is associated with a second multiple-link device (MLD2), while another STA is associated with a first multiple-link device (MLD1) for performing non-simultaneous transmit receive (NSTR) communications; (d)(ii) wherein MLD1 is the transmit opportunity (TXOP) holder of a first link (Link1); (d)(iii) wherein a second MLD (MLD2) is the TXOP holder of a second link (Link2) and intends to transmit to MLD1 on Link2; (d)(iv) transmitting a non-simultaneous transmit receive (NSTR) coordination request by MLD2 to MLD1 over Link2; (d)(v) wherein if MLD2 requested a response frame from MLD1 then it receives a response frame from MLD1 indicating whether it has accepted or rejected said NSTR coordination request; and (d)(vi) wherein transmissions are arranged on both Link1 and Link2 by either MLD1 or MLD2, if the NSTR coordination request is accepted, after which the transmissions are performed.

A method of performing wireless communication in a network, comprising: (a) performing multi-link operations by a wireless communication circuit, as a station (STA), over multiple links of a channel using carrier sense multiple access/collision avoidance (CSMA/CA) to access a channel for communicating with other wireless stations (STAs) of a network; (b) performing non-simultaneous transmit receive (NSTR) communications by a first multiple-link device (MLD1) which has become a transmit opportunity (TXOP) holder of a first link (Link1); (c) accessing the channel on a second link (Link2) by said STA which is associated with second multiple-link device (MLD2) for transmitting to MLD1; (d) transmitting immediately by MLD2 over Link2 to MLD1, if MLD1 is receiving on Link1; and (e) transmitting a frame by MLD2 over Link2 to occupy the channel, if MLD1 is transmitting on Link1, then when MLD1 is receiving on Link1 then MLD2 transmits another frame to MLD1.

Wireless communication system/apparatus performing transmission of packets, where CSMA/CA and multi-link operation are applied, Link1 and Link2 are a NSTR link pair of MLD1 and MLD1 is TXOP holder on Link1, comprising: (a) MLD2 accesses the channel on Link2 and is to transmit to MLD1; (b) MLD2 transmits to MLD1 over Link2 immediately if MLD1 is receiving on Link1; and (c) MLD2 transmits a frame to occupy the channel if MLD1 is transmitting on Link1 and transmit another frame to MLD1 when it is receiving on Link1.

Wireless communication system/apparatus performing transmission of packets, where CSMA/CA and multi-link operation are applied, Link1 and Link2 are a NSTR link pair of MLD1, MLD1 is TXOP holder on Link1, MLD2 is the TXOP holder and is to transmit to MLD1 on Link2, comprising: (a) MLD2 sends a NSTR coordination request to MLD1 over Link2; (b) MLD1 then sends a response frame to accept or reject the request; (c) wherein either MLD1 or MLD2 arranges the transmissions on both Link1 and Link2 if the request is accepted.

The apparatus, system or method of any preceding implementation, wherein MLD2 transmits a dummy frame which does not contain a data packet, to reserve a portion of the TXOP and occupy the channel; then MLD2 transmits a frame with data packet to MLD1 over Link2 when MLD1 commences receiving on Link1 before the TXOP ends.

The apparatus, system or method of any preceding implementation, wherein MLD2 re-contends for the channel without increasing its contention window (CW) if MLD2 has determined not to wait for a time when MLD1 is receiving on Link1.

The apparatus, system or method of any preceding implementation, wherein MLD2 transmits a ready-to-send (RTS) or a multi-user RTS (MU-RTS), which incorporates padding to occupy the channel on Link2.

The apparatus, system or method of any preceding implementation, wherein MLD2 transmits a clear-to-send (CTS) to MLD1, or CTS-to-self, to occupy the channel on Link2.

The apparatus, system or method of any preceding implementation, wherein MLD2 transmits a transmit opportunity (TXOP) sharing frame to occupy the channel on Link2.

The apparatus, system or method of any preceding implementation, wherein MLD2 transmits a transmit opportunity (TXOP) sharing frame to share the TXOP with other STAs on Link2 until MLD1 is receiving on Link1.

The apparatus, system or method of any preceding implementation, wherein MLD2 transmits a NSTR coordination indication frame to commence NSTR coordination without requesting a response frame from MLD1.

The apparatus, system or method of any preceding implementation, wherein MLD2 performs stopping its current TXOP in response to receiving a frame from MLD1 indicating it has rejected the NSTR coordination request.

The apparatus, system or method of any preceding implementation, wherein MLD2 does not require receiving a rejection of the NSTR coordination request, as MLD1 may not transmit anything back which indicates its rejection of said NSTR coordination request.

The apparatus, system or method of any preceding implementation, wherein MLD2 transmits a dummy frame which does not contain a data packet, to reserve a portion of the TXOP and occupy the channel; then MLD2 transmits a frame with data packet to MLD1 over Link2 when MLD1 commences receiving on Link1 before the TXOP ends.

The apparatus, system or method of any preceding implementation, wherein MLD2 re-contends for the channel without increasing its contention window (CW) if MLD2 has determined not to wait for a time when MLD1 is receiving on Link1.

The apparatus, system or method of any preceding implementation, wherein MLD2 transmits a ready-to-send (RTS) or a multi-user RTS (MU-RTS), which incorporates padding to occupy the channel on Link2.

The apparatus, system or method of any preceding implementation, wherein MLD2 transmits a clear-to-send (CTS) to MLD1, or CTS-to-self, to occupy the channel on Link2.

The apparatus, system or method of any preceding implementation, wherein MLD2 transmits a transmit opportunity (TXOP) sharing frame to occupy the channel on Link2.

The apparatus, system or method of any preceding implementation, wherein MLD2 transmits a transmit opportunity (TXOP) sharing frame to share the TXOP with other STAs on Link2 until MLD1 is receiving on Link1.

The apparatus, system or method of any preceding implementation, where MLD2 could send a frame to reserve a short TXOP to occupy the channel and send frame to MLD1 if there is a chance before TXOP ends.

The apparatus, system or method of any preceding implementation, where MLD2 could decide not to transmit to MLD1 over Link2.

The apparatus, system or method of any preceding implementation, where MLD2 could re-contend the channel without increasing the CW if it could not wait a time that MLD1 is receiving on Link1.

The apparatus, system or method of any preceding implementation, where MLD2 could send an RTS or MU-RTS with padding to occupy the channel on Link2.

The apparatus, system or method of any preceding implementation, where MLD2 could send an CTS to MLD1 or CTS-to-self to occupy the channel on Link2.

The apparatus, system or method of any preceding implementation, where MLD2 could send a TXOP sharing frame to occupy the channel on Link2.

The apparatus, system or method of any preceding implementation, where MLD2 could send a TXOP sharing frame to share the TXOP with other STAs on Link2 until it gets a chance to send to MLD1.

The apparatus, system or method of any preceding implementation, where MLD2 could send a NSTR coordination indication frame to start NSTR coordination without requesting response frame from MLD1.

The apparatus, system or method of any preceding implementation, where MLD1 could send a frame to reject the NSTR coordination request.

The apparatus, system or method of any preceding implementation, where MLD1 could not send anything back to reject the NSTR coordination request.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes," "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

UP to AC Mapping

| Priority | User Priority (UP) | IEEE 802.1D designation | Transmit queue | AC |
|---|---|---|---|---|
| Low | 1 | Background (BK) | BK | BK |
| ↓ | 2 | Spare (—) | BK | BK |
|  | 0 | Best Effort (BE) | BE | BE |
|  | 3 | Excellent Effort (EE) | BE | BE |
|  | 4 | Control Load (CL) | A_VI | VI |
|  | 5 | Video (VI) | VI | VI |
|  | 6 | Voice (VO) | VO | VO |
| High | 7 | Network Control (NC) | A_VO | VO |

TABLE 2

Default Parameter Set

| AC | CWmin | CWmax | AIFSN | TXOP limit |
|---|---|---|---|---|
| BK | 15 | 1023 | 7 | 0 |
| BE | 15 | 1023 | 3 | 0 |
| VI | 7 | 15 | 2 | 3 ms |
| VO | 3 | 7 | 2 | 1.5 ms |

What is claimed is:

1. An apparatus for wireless communication in a network, the apparatus comprising:
   (a) a wireless multiple-link device (MLD) having multiple stations (STAs) affiliated with the MLD for performing multi-link operations over multiple links using carrier sense multiple access/collision avoidance (CSMA/CA) for communicating with other wireless stations (STAs) of a network;
   (b) a processor of said MLD for performing a communication protocol over at least a first link and a second link;
   (c) a non-transitory memory storing instructions executable by the processor for communicating with other STAs on the network; and
   (d) wherein said instructions, when executed by the processor, performs steps comprising:
      (i) wherein said MLD is affiliated with another MLD on the network, and said MLD can determine the transmitting and receiving status of STA1 on a first link (Link1) of that other MLD because STA3 of said MLD is transmitting or receiving with STA1 on Link1 of that other MLD;
      (ii) wherein said MLD is configured for simultaneous transmit and receive (STR) and the other MLD is configured for non-simultaneous transmit receive (NSTR) communications;
      (iii) wherein said MLD contends and obtains channel access over a second link (Link2) to the other MLD, wherein the other MLD is a transmit opportunity (TXOP) holder of Link1; and
      (iv) wherein said MLD immediately transmits over Link2 to the other MLD if that other MLD is receiving on Link1; or wherein said MLD transmits a frame over Link2 to occupy the channel if the other MLD is transmitting on Link1; wherein afterward when the other MLD is receiving on Link1, then said MLD performs transmitting another frame to the other MLD.

2. The apparatus of claim 1, wherein said MLD transmits a frame over Link2 to occupy the channel by transmitting a dummy frame which does not contain a data packet, to reserve a portion of the TXOP and occupy the channel; then said MLD transmits a frame with data packet to the other MLD over Link2 when the other MLD commences receiving on Link1 before the TXOP ends.

3. The apparatus of claim 1, wherein said MLD re-contends for the channel without increasing its contention window (CW) in the case in which said MLD has transmitted a frame over Link2 to occupy the channel.

4. The apparatus of claim 1, wherein said MLD transmits a ready-to-send (RTS) or a multi-user RTS (MU-RTS), which incorporates padding to occupy the channel on Link2.

5. The apparatus of claim 1, wherein MLD2 transmits a clear-to-send (CTS) to MLD1, or CTS-to-self, to occupy the channel on Link2.

6. The apparatus of claim 1, wherein MLD2 transmits a transmit opportunity (TXOP) sharing frame to occupy the channel on Link2.

7. The apparatus of claim 1, wherein MLD2 transmits a transmit opportunity (TXOP) sharing frame to share the TXOP with other STAs on Link2 until MLD1 is receiving on Link1.

8. An apparatus for wireless communication in a network, the apparatus comprising:
   (a) a wireless multiple-link device (MLD) having multiple stations (STAs) affiliated with the MLD for performing multi-link operations over multiple links of a channel using carrier sense multiple access/collision avoidance (CSMA/CA) to access a channel for communicating with other wireless stations (STAs) of a network;
   (b) a processor of said wireless MLD for performing a communication protocol over at least a first link and a second link;
   (c) a non-transitory memory storing instructions executable by the processor for communicating with other STAs on the network; and
   (d) wherein said instructions, when executed by the processor, performs (d) steps comprising:

(i) wherein said MLD is affiliated with another MLD on the network, and said MLD can determine the transmitting and receiving status of STA1 on a first link (Link1) of that other MLD because STA3 of said MLD is transmitting or receiving with STA1 on Link1 of that other MLD which has non-simultaneous transmit receive (NSTR) communications capability;
(ii) wherein the other MLD is a transmit opportunity (TXOP) holder of the first link (Link1);
(iii) wherein said MLD is the TXOP holder of the second link (Link2) and intends to transmit to the other MLD on Link2;
(iv) transmitting a non-simultaneous transmit receive (NSTR) coordination request by said MLD to the other MLD over Link2;
(v) wherein if said MLD is requesting a response frame from the other MLD, then said MLD awaits receiving a response frame from the other MLD that indicates it has accepted said NSTR coordination request; and
(vi) wherein transmissions are arranged on both Link1 and Link2 by coordination between said MLD and the other MLD, after which the transmissions are performed.

9. The apparatus of claim 8, wherein said MLD transmits a NSTR coordination indication frame to commence NSTR coordination without requesting a response frame from the other MLD.

10. The apparatus of claim 8, wherein said MLD stops its current TXOP in response to receiving a response frame from the other MLD indicating it has rejected the NSTR coordination request.

11. The apparatus of claim 8, wherein said MLD does not require receiving a rejection of the NSTR coordination request, as it is uncertain whether the other MLD will transmit anything back indicating its rejection of said NSTR coordination request.

12. A method of performing wireless communication in a network, comprising:
(a) performing multi-link operations between multiple-link devices (MLDs), each having more than one station (STA), over multiple links of a channel using carrier sense multiple access/collision avoidance (CSMA/CA) to access a channel for communicating with other wireless stations (STAs) of a network;
(b) performing non-simultaneous transmit receive (NSTR) communications by a first multiple-link device (MLD1) which has become a transmit opportunity (TXOP) holder of a first link (Link1);
(c) accessing the channel on a second link (Link2) associated with a second multiple-link device (MLD2) for transmitting to MLD1; and
(d) transmitting immediately by MLD2 over Link2 to MLD1, if MLD1 is receiving on Link1; or transmitting a frame by MLD2 over Link2 to occupy the channel, if MLD1 is transmitting on Link1, then when MLD1 is receiving on Link1 then MLD2 transmits another frame to MLD1.

13. The method of claim 12, wherein MLD2 transmits a dummy frame which does not contain a data packet, to reserve a portion of the TXOP and occupy the channel; then MLD2 transmits a frame with data packet to MLD1 over Link2 when MLD1 commences receiving on Link1 before the TXOP ends.

14. The method of claim 12, wherein MLD2 re-contends for the channel without increasing its contention window (CW).

15. The method of claim 12, wherein MLD2 transmits a ready-to-send (RTS) or a multi-user RTS (MU-RTS), which incorporates padding to occupy the channel on Link2.

16. The method of claim 12, wherein MLD2 transmits a clear-to-send (CTS) to MLD1, or CTS-to-self, to occupy the channel on Link2.

17. The method of claim 12, wherein MLD2 transmits a transmit opportunity (TXOP) sharing frame to occupy the channel on Link2.

18. The method of claim 12, wherein MLD2 transmits a transmit opportunity (TXOP) sharing frame to share the TXOP with other STAs on Link2 until MLD1 is receiving on Link1.

* * * * *